(12) United States Patent
Takeuchi et al.

(10) Patent No.: US 6,249,370 B1
(45) Date of Patent: Jun. 19, 2001

(54) DISPLAY DEVICE

(75) Inventors: Yukihisa Takeuchi, Nishikamo-Gun; Natsumi Shimogawa, Nagoya; Shigeki Okada, Nishio; Masao Takahashi, Ama-Gun, all of (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 09/397,229

(22) Filed: Sep. 16, 1999

(30) Foreign Application Priority Data

Sep. 18, 1998 (JP) .................................................. 10-265487

(51) Int. Cl.$^7$ ...................................................... G02B 26/00
(52) U.S. Cl. ........................ 359/291; 359/290; 359/295; 359/227; 359/230; 359/320; 359/323; 345/85
(58) Field of Search ..................................... 359/227, 222, 359/224, 226, 230, 245, 320, 322, 323, 290, 291, 295; 345/84, 85, 108, 109

(56) References Cited

U.S. PATENT DOCUMENTS

| 2,565,514 | 8/1951 | Pajes . | |
|---|---|---|---|
| 2,997,922 | 8/1961 | Kaprelian . | |
| 3,376,092 | 4/1968 | Kushner et al. . | |
| 3,698,793 | 10/1972 | Tellerman . | |
| 4,740,785 | * 4/1988 | Stroomer et al. | 345/85 |
| 4,786,149 | * 11/1988 | Hoenig et al. | 359/291 |
| 5,319,491 | 6/1994 | Selbrede | 359/291 |
| 5,450,230 | * 9/1995 | Masuda et al. | 359/323 |
| 5,745,281 | * 4/1998 | Yi et al. | 359/290 |
| 5,771,321 | 6/1998 | Stern | 385/31 |
| 5,774,257 | 6/1998 | Shibata et al. | 359/291 |
| 5,781,331 | * 7/1998 | Carr et al. | 359/291 |
| 5,953,469 | 9/1999 | Zhou | 385/22 |
| 6,034,807 | * 3/2000 | Little et al. | 359/227 |

FOREIGN PATENT DOCUMENTS

| 0 851 260 A2 | 7/1998 | (EP) . |
| 7-287176 | 10/1995 | (JP) . |
| 10-78549 | 3/1998 | (JP) . |
| WO 98/19201 | 5/1998 | (WO) . |

* cited by examiner

Primary Examiner—Loha Ben
(74) Attorney, Agent, or Firm—Burr & Brown

(57) ABSTRACT

Disclosed is a display device comprising a light-shielding plate including a metal thin film formed on a first principal surface of an optical waveguide plate for introducing the light thereinto and including light-transmitting sections formed at portions corresponding to picture elements to make penetration through the optical waveguide plate, and shutter sections provided opposingly to a second principal surface of the light-shielding plate, for selectively intercepting the light transmitted through the light-transmitting sections in accordance with an input signal. The shutter sections include actuator elements provided corresponding to the large number of light-transmitting sections so that the light to be transmitted through the light-transmitting sections is intercepted substantially in synchronization with the operation of the actuator elements. Accordingly, it is possible to improve the contrast and improve the image quality of a displayed image.

17 Claims, 38 Drawing Sheets

DISPLAY DEVICE

BACKGROUND OF THE INVENTION

1. Field of the Invention

The present invention relates to a display device for displaying a picture image corresponding to an input signal on a light-shielding plate by selectively intercepting the light to be transmitted through a light-transmitting section provided through the light-shielding plate, depending on the input signal.

2. Description of the Related Art

Those hitherto known as the display device include, for example, cathode ray tubes (CRT) and liquid crystal display devices.

Those known as the cathode ray tube include, for example, ordinary television receivers and monitor units for computers. Although the cathode ray tube has a bright screen, it consumes a large amount of electric power. Further, the cathode ray tube involves a problem in that the depth of the entire display device is large as compared with the size of the screen.

On the other hand, the liquid crystal display device is advantageous in that the entire device can be miniaturized, and the display device consumes a small amount of electric power. However, the liquid crystal display device involves problems in that it is inferior in brightness of the screen, and the field angle of the screen is narrow.

In the case of the cathode ray tube and the liquid crystal display device, it is necessary for a color screen to use a number of picture elements (image pixels) which is three times a number of picture elements used in a black-and-white screen. For this reason, other problems occur in that the device itself is complicated, a great deal of electric power is consumed, and it is inevitable to cause an increase in cost.

In order to solve the problems described above, the present applicant has suggested a novel display device (see, for example, Japanese Laid-Open Patent Publication No. 7-287176). As shown in FIG. 38, this display device includes actuator elements 400 arranged for respective picture elements. Each of the actuator elements 400 comprises a main actuator element 408 including a piezoelectric/electrostrictive layer 402 and an upper electrode 404 and a lower electrode 406 formed on upper and lower surfaces of the piezoelectric/electrostrictive layer 402 respectively, and an actuator substrate 414 including a vibrating section 410 and a fixed section 412 disposed under the main actuator element 408. The lower electrode 406 of the main actuator element 408 contacts with the vibrating section 410. The main actuator element 408 is supported by the vibrating section 410.

The actuator substrate 414 is composed of ceramics in which the vibrating section 410 and the fixed section 412 are integrated into one unit. A recess 416 is formed in the actuator substrate 414 so that the vibrating section 410 is thin-walled.

A displacement-transmitting section 420 for obtaining a predetermined size of contact area with respect to an optical waveguide plate 418 is connected to the upper electrode 404 of the main actuator element 408. In the illustrative display device shown in FIG. 38, the displacement-transmitting section 420 is arranged such that it is located closely near to the optical waveguide plate 418 in the OFF selection state or the unselection state in which the actuator element 400 stands still, while it contacts with the optical waveguide plate 418 in the ON selection state at a distance of not more than the wavelength of the light.

The light 422 is introduced, for example, from a lateral end of the optical waveguide plate 418. In this arrangement, all of the light 422 is totally reflected at the inside of the optical waveguide plate 418 without being transmitted through front and back surfaces thereof by controlling the magnitude of the refractive index of the optical waveguide plate 418. In this state, a voltage signal corresponding to an attribute of an image signal is selectively applied to the actuator element 400 by the aid of the upper electrode 404 and the lower electrode 406 so that the actuator element 400 is allowed to make a variety of displacement actions in conformity with the ON selection, the OFF selection, and the unselection. Thus, the displacement-transmitting section 420 is controlled for its contact and separation with respect to the optical waveguide plate 418. Accordingly, the scattered light (leakage light) 424 is controlled at a predetermined portion of the optical waveguide plate 418, and a picture image corresponding to the image signal is displayed on the optical waveguide plate 418.

When a color picture is displayed by using the display device, the following operation is performed. That is, for example, light sources for the three primary colors are switched to control the light emission time for the three primary colors, while synchronizing the contact time between the optical waveguide plate and the displacement-transmitting plate with the cycle of color development. Alternatively, the contact time between the optical waveguide plate and the displacement-transmitting plate is controlled, while synchronizing the light emission time for the three primary colors with the color development cycle.

Therefore, the illustrative display device suggested by the present applicant is advantageous in that it is unnecessary to increase the number of picture elements as compared with the black-and-white screen, even when the display device is applied to a color display system.

SUMMARY OF THE INVENTION

An object of the present invention is to provide a display device which makes it possible to improve the contrast and improve the image quality of the displayed image, by improving the arrangement of the illustrative display device suggested by the present applicant.

According to the present invention, there is provided a display device comprising a light-shielding plate; light-transmitting sections formed on the light-shielding plate corresponding to a large number of picture elements, for transmitting light toward a first principal surface of the light-shielding plate; and a shutter means provided opposingly to a second principal surface of the light-shielding plate, for selectively intercepting the light to be transmitted through the light-transmitting section, in response to an input signal.

Accordingly, at first, when the light-intercepting operation is not performed by the shutter means, the light is radiated from the first principal surface of the light-shielding plate through the large number of light-transmitting sections provided through the light-shielding plate. At this stage, when a specified picture element is selected in response to the input signal, the light, which has been transmitted through the light-transmitting section corresponding to the concerning picture element, is intercepted by the shutter means.

On the contrary, when the light-intercepting operation is performed by the shutter means for all of the light-transmitting sections, then the light is intercepted by the shutter means, and the light is not radiated from the first principal surface of the light-shielding plate. That is, the black background is displayed. At this stage, when a specified picture element is selected in response to the input signal, the light-intercepting operation effected by the shutter means is stopped for the light-transmitting section corresponding to the concerning picture element. Accordingly, the light is transmitted through the light-shielding plate through the light-transmitting section. Thus, the light is radiated from the portion of the first principal surface of the light-shielding plate corresponding to the concerning light-transmitting section.

Usually, in the case of the display apparatus such as CRT, the black level differs between the black background display on the screen obtained when the device is not in the operation state (state in which the power source is shut off) and the black background display obtained when the device is in the operation state. This difference is caused by any minute light radiation from portions other than the picture elements in the operation state, which results in the decrease in contrast.

On the other hand, in the display device according to the present invention, it is premised that the light is firstly intercepted by the light-shielding plate. The light is selectively radiated only through the large number of light-transmitting sections specifically provided for the light-shielding plate.

Therefore, no light is radiated from portions other than the light-transmitting sections. The black level of the black background display on the screen obtained when the device is not in the operation state is approximately the same as that of the black background display obtained when the device is in the operation state. This feature contributes to the improvement in contrast, and it results in the improvement in image quality of the displayed image as well.

It is also preferable for the display device constructed as described above that the shutter means comprises an actuator element provided corresponding to each of the large number of light-transmitting sections; and a shutter mechanism for intercepting the light to be transmitted through the light-transmitting section substantially in synchronization with operation of the actuator element.

In this arrangement, when a specified picture element is selected in response to the input signal, the actuator element corresponding to the concerning picture element is operated. The shutter mechanism intercepts the light to be transmitted through the light-transmitting section corresponding to the concerning picture element substantially in synchronization with the operation of the concerning actuator element.

It is also preferable for the display device constructed as described above that the shutter mechanism includes a displacement-transmitting section formed on the actuator element; and a light-shielding section is provided at a portion of the displacement-transmitting section opposed to the light-shielding plate.

In this arrangement, the light to be transmitted through the concerning light-transmitting section is intercepted by the light-shielding section of the displacement-transmitting section at the point of time at which the displacement-transmitting section arrives at the light-transmitting section after the actuator element is operated.

It is also preferable that the light-shielding section of the displacement-transmitting section is provided at a position at which an optical path communicating with the outside through the light-transmitting section is intercepted when the actuator element is operated.

In this arrangement, it is also preferable that the optical path is intercepted by displacing the light-shielding section with respect to the second principal surface of the light-shielding plate in its normal direction in accordance with the operation of the actuator element.

It is preferable that the aperture width of the light-transmitting section is large in order to obtain a larger amount of light. The more integrated and more minute the actuator element is, the smaller the obtained displacement is. In general, it is conceived that the shutter means intercepts the light to be transmitted through the light-transmitting section by sliding a shield plate along the second principal surface or the first principal surface of the light-shielding plate. In this system, if the aperture width of the light-transmitting section is large, it is necessary to increase the displacement for effecting the sliding movement corresponding thereto. However, in the present invention, the light to be transmitted through the light-transmitting section is intercepted by displacing the light-shielding section in the normal direction with respect to the second principal surface of the light-shielding plate. Therefore, the light-transmitting section having the large aperture can be intercepted by using the small displacement.

It is also preferable for the display device constructed as described above that the light-shielding plate is arranged such that at least its first principal surface and an inner wall surface of the light-transmitting section are shielded from light. In this arrangement, the light-shielding plate may be constructed by using a metal plate, or the light-shielding plate may be constructed by forming a light-reflective film (metal film) on an optical waveguide plate.

When the optical waveguide plate is used, the light-shielding plate may be constructed as follows. That is, the first principal surface of the optical waveguide plate and the inner wall surface of the light-transmitting section are shielded from light; and a light-introducing section for releasing the light introduced into the optical waveguide plate as leakage light is provided at a portion of a second principal surface of the optical waveguide plate in the vicinity of the light-transmitting section.

In this arrangement, a part of the light, which is introduced, for example, from the lateral end of the optical waveguide plate, passes through the light-introducing section, and it is radiated as the leakage light from the second principal surface of the optical waveguide plate. The leakage light generates the light to be transmitted through the light-transmitting section. The generated light passes through the light-transmitting section, and it is radiated from the first principal surface of the light-shielding plate. When a specified picture element is selected in response to the input signal, the light, which has been transmitted through the light-transmitting section corresponding to the concerning picture element, is intercepted by the shutter means.

It is also preferable for the display device constructed as described above that the light-introducing section is constructed by a mediating element formed at a portion of the second principal surface of the light-shielding plate in the vicinity of the light-transmitting section. Alternatively, it is also preferable that a portion of the second principal surface of the light-shielding plate except for the light-introducing section is shielded from light. It is intended that the mediating element includes at least a fluorescent element and a light-scattering element.

It is preferable to use those in which the optical waveguide plate is used for the light-shielding plate, because the light from the light source can be efficiently radiated in the vicinity of a light-emitting section. It is more preferable to form the light-introducing section. It is still more preferable to form the mediating element at the light-introducing section.

It is also preferable that a light-emitting section is disposed on a side of the second principal surface of the light-shielding plate; and the light to be transmitted through the light-transmitting section is generated by radiating the light introduced from the outside onto the light-emitting section. Alternatively, it is also preferable that a light-emitting section is disposed on a side of the second principal surface of the light-shielding plate; and the light to be transmitted through the light-transmitting section is generated by radiating the leakage light from the optical waveguide plate onto the light-emitting section.

In this arrangement, it is also preferable that the light-emitting section is constructed by a light-emitting element or a reflective element provided corresponding to each of the displacement-transmitting sections.

It is also preferable for the display device constructed as described above that the actuator element is formed on an actuator substrate made of ceramics.

In this arrangement, it is also preferable that the actuator substrate is formed as a thin-walled diaphragm section, and the actuator element is formed in an integrated manner thereon. Alternatively, it is also preferable that the actuator substrate has at least one hollow space, a thin-walled portion thereof is formed as a diaphragm section, and the actuator element is formed in an integrated manner thereon.

It is also preferable that the actuator element includes a shape-retaining layer for making movement in a direction to make separation and/or approach from the second principal surface of the light-shielding plate in accordance with an applied electric field, and an operating section having at least a pair of electrodes formed on the shape-retaining layer.

The above and other objects, features, and advantages of the present invention will become more apparent from the following description when taken in conjunction with the accompanying drawings in which preferred embodiments of the present invention are shown by way of illustrative examples.

DESCRIPTION OF THE PREFERRED EMBODIMENTS

Several illustrative embodiments of the display device according to the present invention will be explained below with reference to FIGS. 1 to 37.

Figure 1:
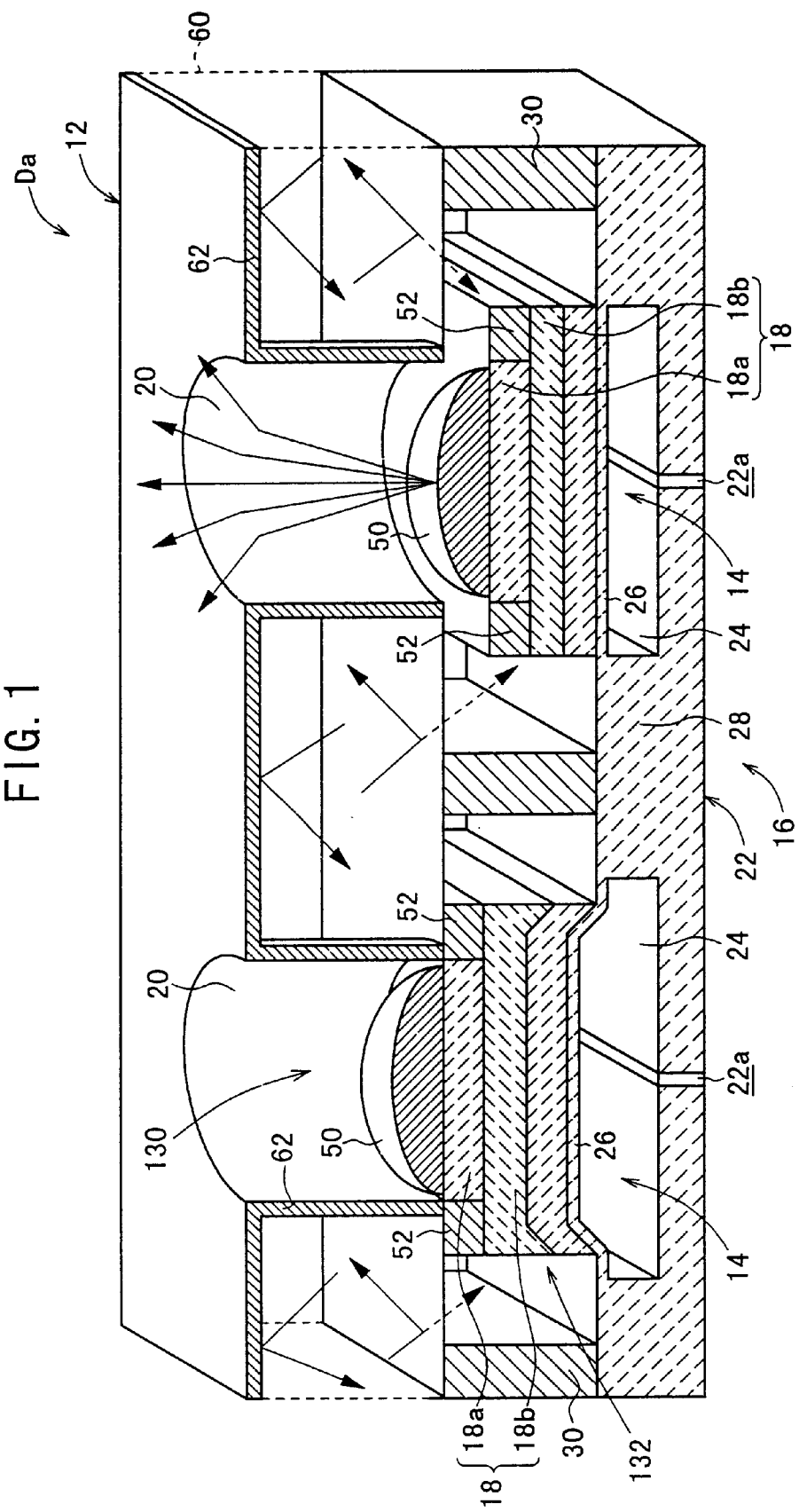
FIG. 1 shows an arrangement illustrating a display device according to a first embodiment.

As shown in FIG. 1, a display device Da according to the first embodiment comprises a light-shielding plate 12, and a driving section 16 provided opposingly to the back surface of the light-shielding plate 12 and including a large number of actuator elements 14 which are arranged corresponding to picture elements (image pixels) in a matrix configuration or in a zigzag configuration.

A displacement-transmitting section 18 is stacked on each of the actuator elements 14. A large number of light-transmitting sections 20 for transmitting the light toward the first principal surface of the light-shielding plate 12 are formed through the light-shielding plate 12. The light-transmitting sections 20 are provided at positions corresponding to the respective actuator elements 14.

The driving section 16 includes an actuator substrate 22 composed of, for example, ceramics. The actuator elements 14 are arranged at positions corresponding to the respective picture elements on the actuator substrate 22. The actuator substrate 22 has its first principal surface which is arranged to oppose to the back surface of the light-shielding plate 12. The first principal surface is a continuous surface (flushed surface). Hollow spaces 24 for forming respective vibrating sections as described later on are provided at positions corresponding to the respective picture elements at the inside of the actuator substrate 22. The respective hollow spaces 24 communicate with the outside via through-holes 22a each having a small diameter and provided at the second principal surface of the actuator substrate 22.

The portion of the actuator substrate 22, at which the hollow space 24 is formed, is thin-walled. The other portion of the actuator substrate 22 is thick-walled. The thin-walled portion has a structure which tends to undergo vibration in response to external stress, and it functions as a vibrating section 26. The portion other than the hollow space 24 is thick-walled, and it functions as a fixed section 28 for supporting the vibrating section 26.

Figure 2:
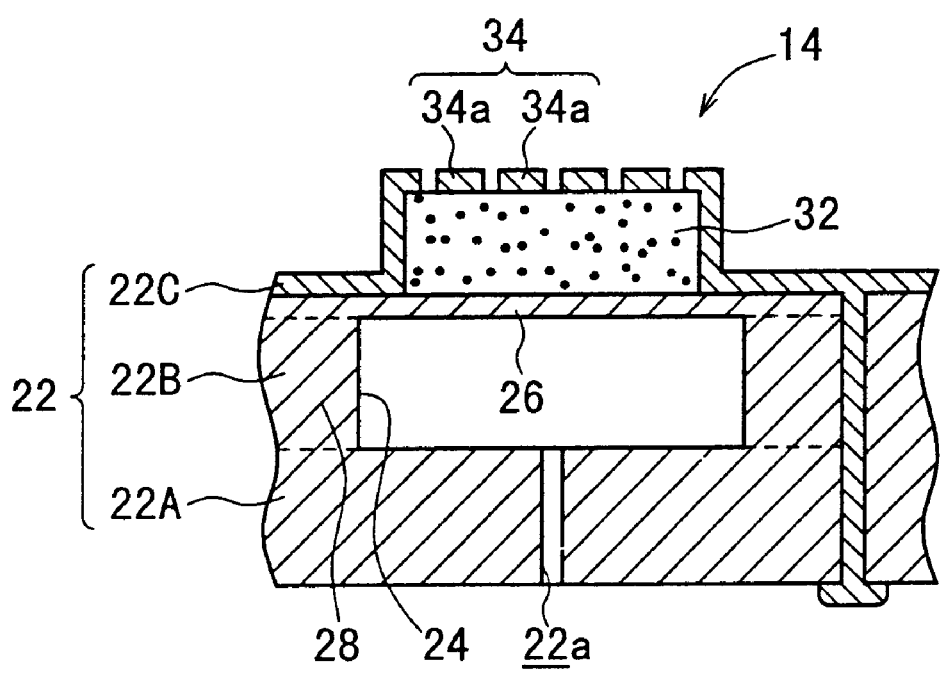
FIG. 2 shows an arrangement illustrating an example of the pair of electrodes formed on an actuator element.

That is, as shown in FIG. 2, the actuator substrate 22 has a stacked structure comprising a substrate layer 22A as a lowermost layer, a spacer layer 22B as an intermediate layer, and a thin plate layer 22C as an uppermost layer. The actuator substrate 22 can be recognized as an integrated structure including the hollow spaces 24 formed at the positions in the space layer 22B corresponding to the picture elements. The substrate layer 22A functions as a substrate for reinceforment, and it functions as a substrate for wiring. The actuator substrate 22 may be sintered in an integrated manner, or it may be additionally attached.

As shown in FIG. 1, the display device Da further comprises crosspieces 30 which are formed at portions other than the actuator elements 14 between the light-shielding plate 12 and the actuator substrate 22. The embodiment shown in FIG. 1 is illustrative of a case in which the light-shielding plate 12 is directly secured to the upper surfaces of the crosspieces 30. It is preferable that the crosspiece 30 is made of a material having a quality not to cause deformation against heat and pressure.

Specified embodiments of the actuator element 14 and the displacement-transmitting section 18 will now be explained with reference to FIGS. 2 to 37.

At first, as shown in FIG. 2, each of the actuator elements 14 comprises the vibrating section 26 and the fixed section 28 described above, as well as a shape-retaining layer 32 composed of, for example, a piezoelectric/electrostrictive layer or an anti-ferroelectric layer directly formed on the vibrating section 26, and a pair of electrodes 34 (a row electrode 34a and a column electrode 34b) formed on an upper surface of the shape-retaining layer 32.

The pair of electrodes 34 may have a structure in which they are formed on upper and lower sides of the shape-retaining layer 32, or they are formed on only one side of the shape-retaining layer 32.

Figure 3:
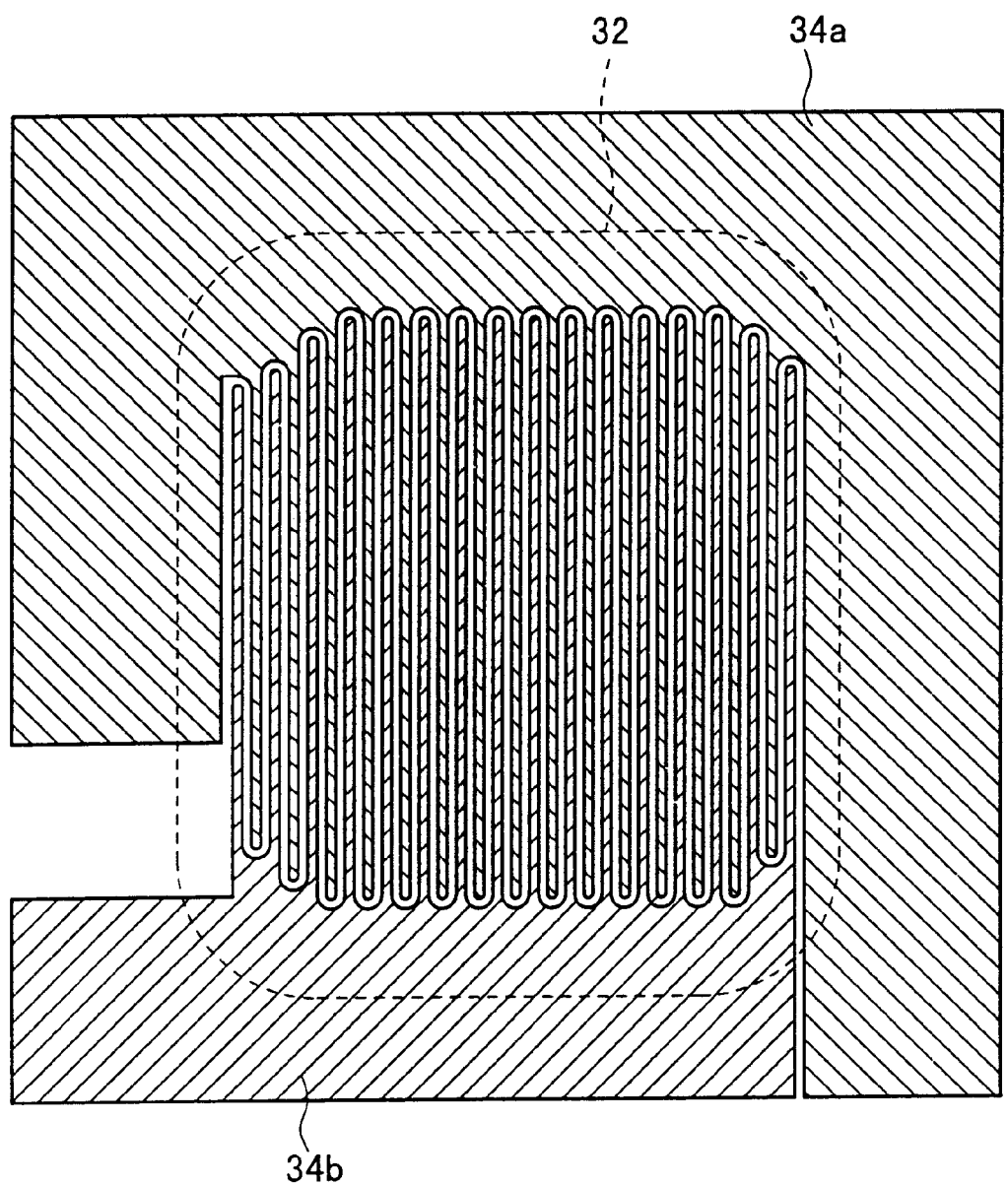
FIG. 3 shows an example of the planar configuration of the pair of electrodes formed on the actuator element.

The planar configuration of the pair of electrodes 34 may be a shape in which a large number of comb teeth are opposed to one another in a complementary manner as shown in FIG. 3. Alternatively, it is possible to adopt, for example, the spiral configuration and the branched configuration as disclosed in Japanese Laid-Open Patent Publication No. 10-78549 as well.

Figure 4A:
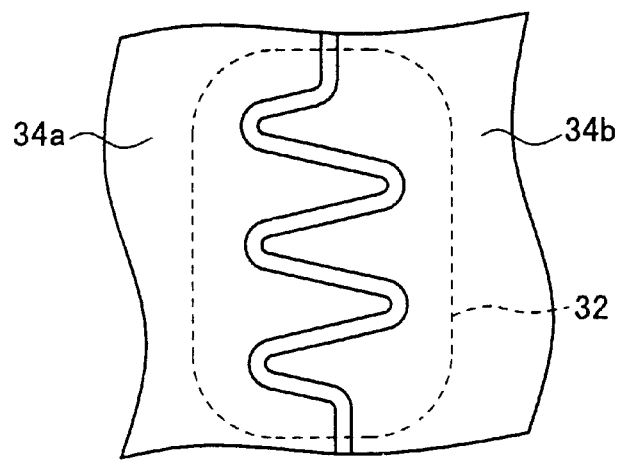
FIG. 4A illustrates an example in which comb teeth of the pair of electrodes are arranged along the major axis of the shape-retaining layer.
Figure 4B:
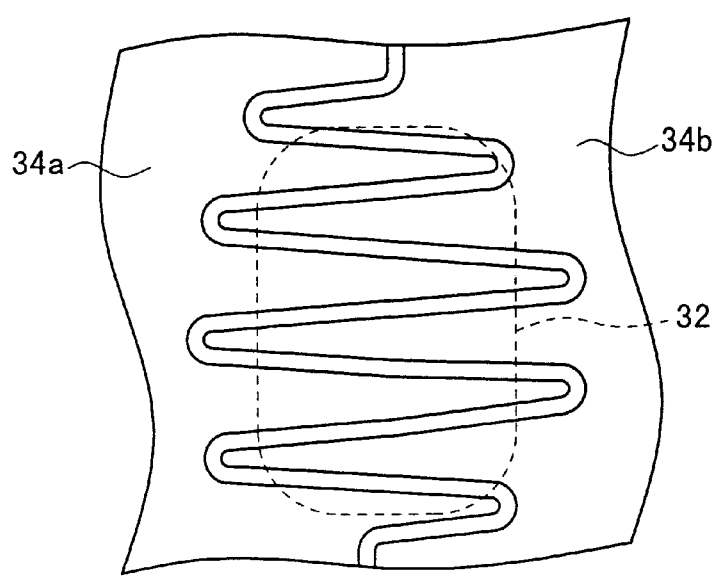
FIG. 4B illustrates another example in which comb teeth of the pair of electrodes are arranged along the major axis of the shape-retaining layer.
Figure 5A:
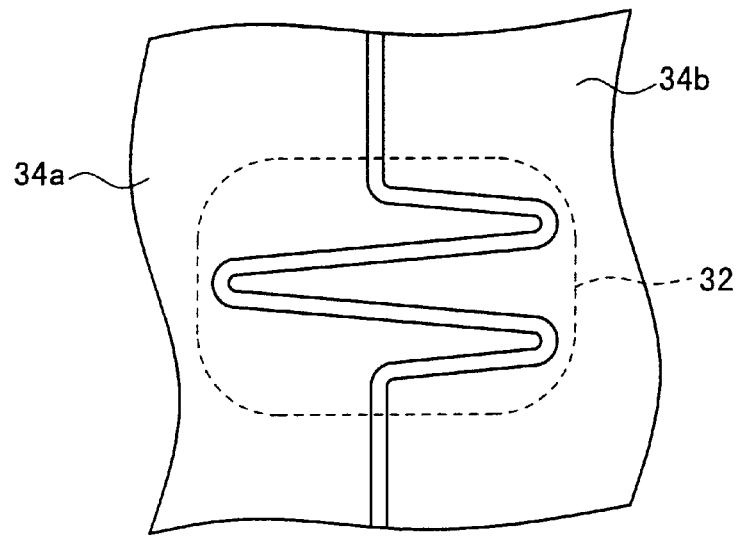
FIG. 5A illustrates an example in which comb teeth of the pair of electrodes are arranged along the minor axis of the shape-retaining layer.
Figure 5B:
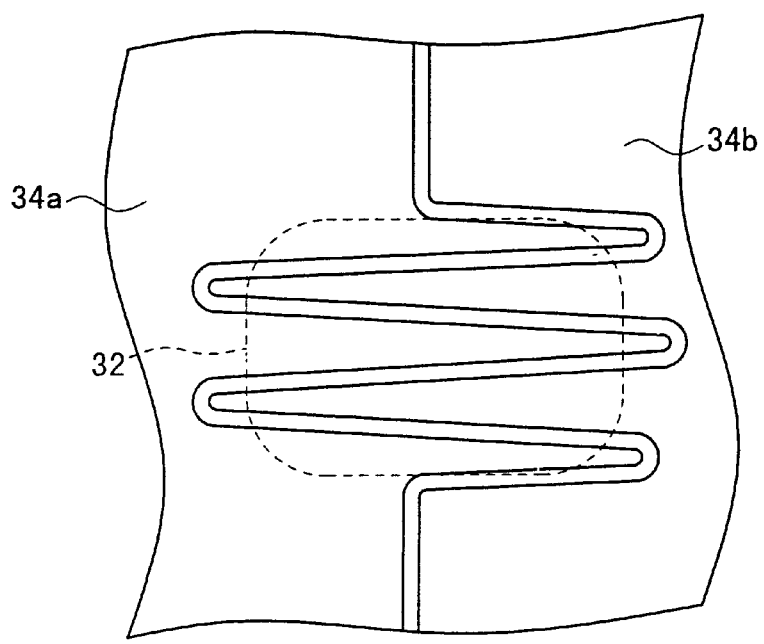
FIG. 5B illustrates another example in which comb teeth of the pair of electrodes are arranged along the minor axis of the shape-retaining layer.

When the planar configuration of the shape-retaining layer 32 is, for example, an elliptic configuration, and the pair of electrodes 34 are formed to have a comb teeth-shaped configuration, then it is possible to use, for example, a form in which the comb teeth of the pair of electrodes 34 are arranged along the major axis of the shape-retaining layer 32 as shown in FIGS. 4A and 4B, and a form in which the comb teeth of the pair of electrodes 34 are arranged along the minor axis of the shape-retaining layer 32 as shown in FIGS. 5A and 5B.

It is possible to use, for example, the form in which the comb teeth of the pair of electrodes 34 are included in the planar configuration of the shape-retaining layer 32 as shown in FIGS. 4A and 5A, and the form in which the comb teeth of the pair of electrodes 34 protrude from the planar configuration of the shape-retaining layer 32 as shown in FIGS. 4B and 5B. The forms shown in FIGS. 4B and 5B are more advantageous to effect the bending displacement of the actuator element 14, because it is possible to increase the region in which the electric field is applied to the shape-retaining layer 32.

Figure 6:
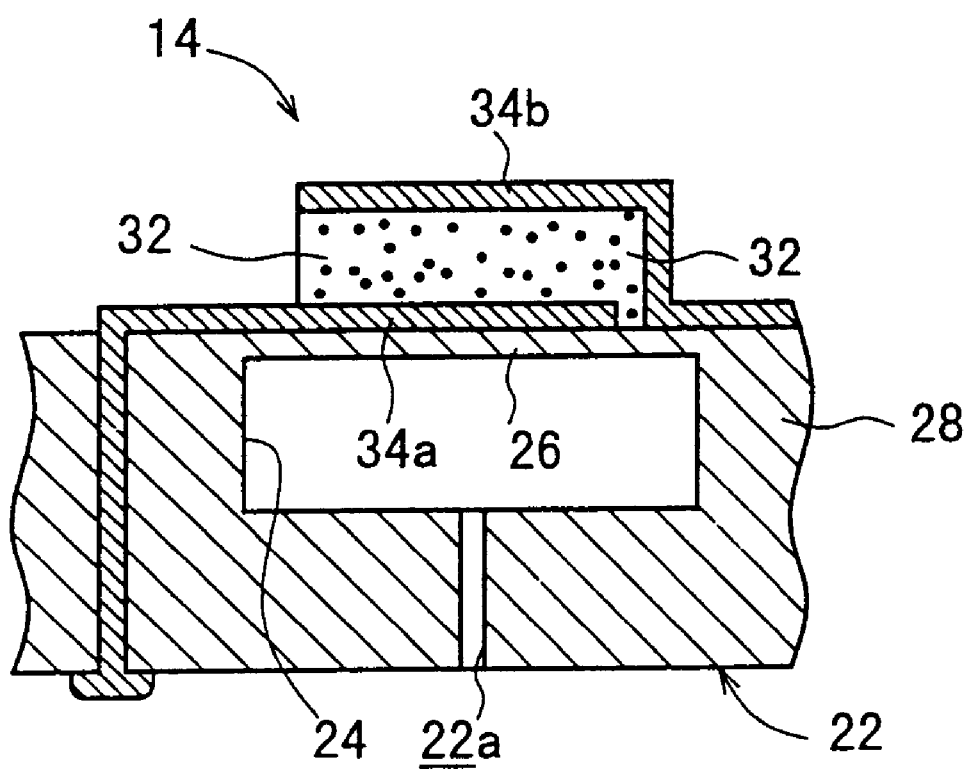
FIG. 6 shows an arrangement illustrating another example of the pair of electrodes formed on the actuator element.

The pair of electrodes 34 may be arranged, for example, as follows as shown in FIG. 6. That is, the row electrode 34a is formed on the lower surface of the shape-retaining layer 32, and the column electrode 34b is formed on the upper surface of the shape-retaining layer 32.

The actuator element 14 will now be explained with reference to FIGS. 7 to 15.

Figure 7:
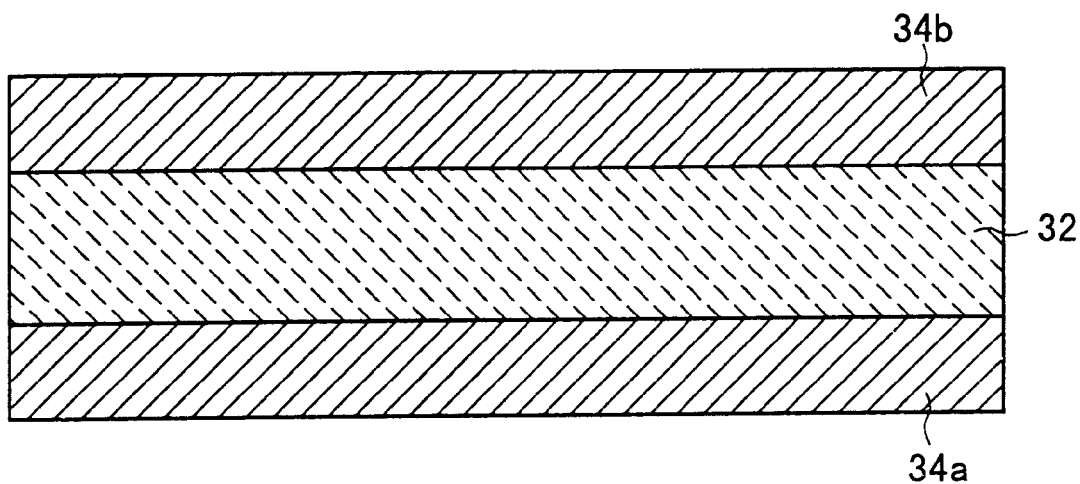
FIG. 7 shows a sectional view illustrating an electrode structure (sandwich type) of the actuator element.
Figure 8:
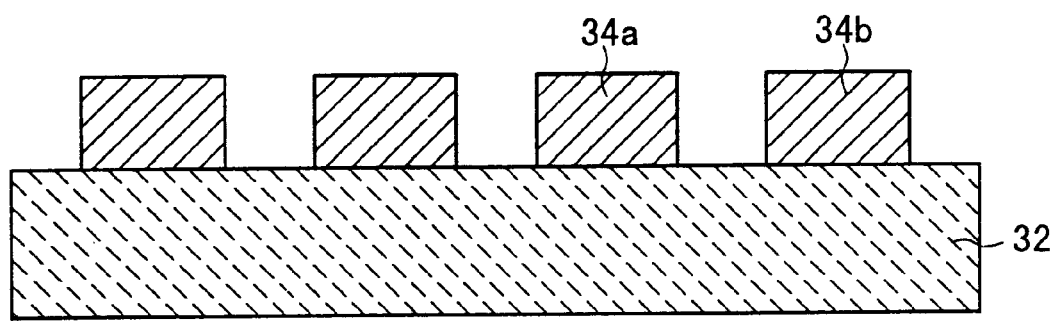
FIG. 8 shows a sectional view illustrating another electrode structure (tiger skin type) of the actuator element.
Figure 9:
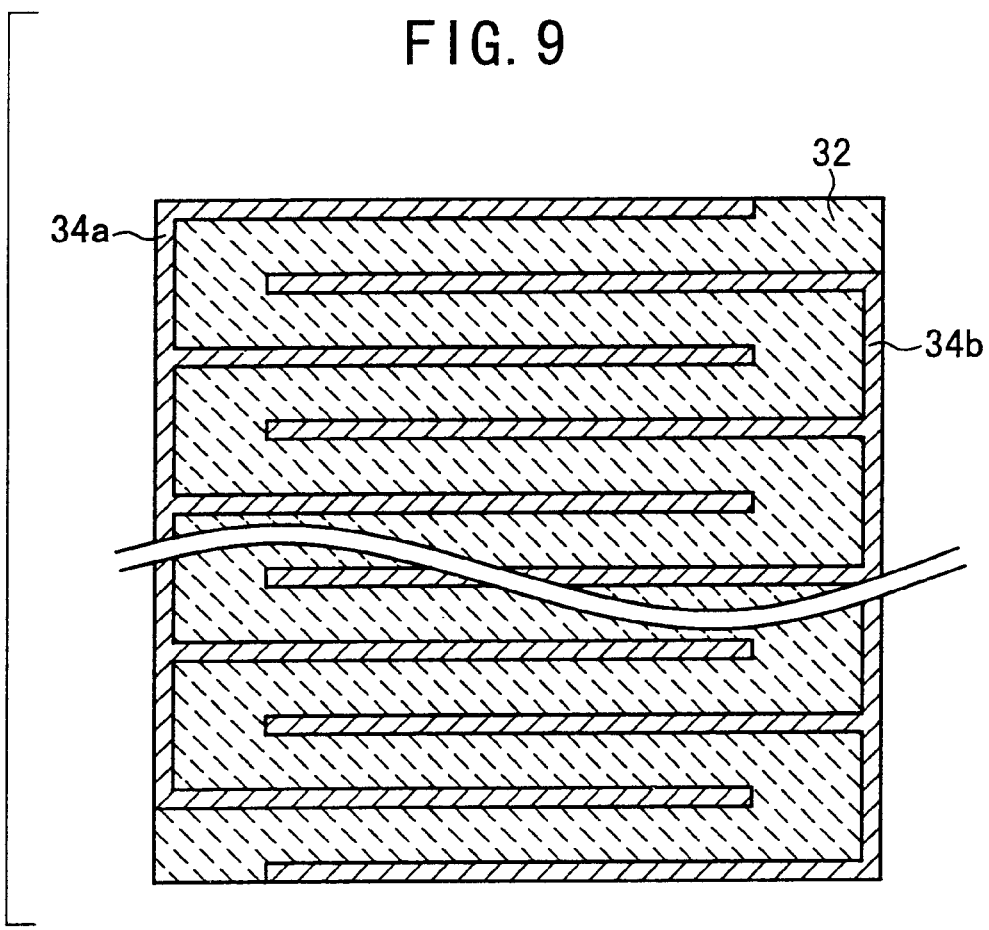
FIG. 9 shows a sectional view illustrating still another electrode structure (stacked type) of the actuator element.

At first, the electrode structure of the actuator element 14 is exemplified by the three types as described above including the type in which the pair of electrodes are formed on the upper surface of the shape-retaining layer 32 (hereinafter conveniently referred to as "tiger skin type", see FIG. 8), the type in which the electrodes 34a, 34b are formed on the upper and lower surfaces of the shape-retaining layer 32 (hereinafter conveniently referred to as "sandwich type", see FIG. 7), and the stacked type as shown in FIG. 9. In these three types, the actuator element 14 is fixed, for example, with resin to be used. Alternatively, as shown in FIG. 2, the components are successively formed in an integrated manner on the actuator substrate 22 to give a film-type element to be used.

Figure 10:
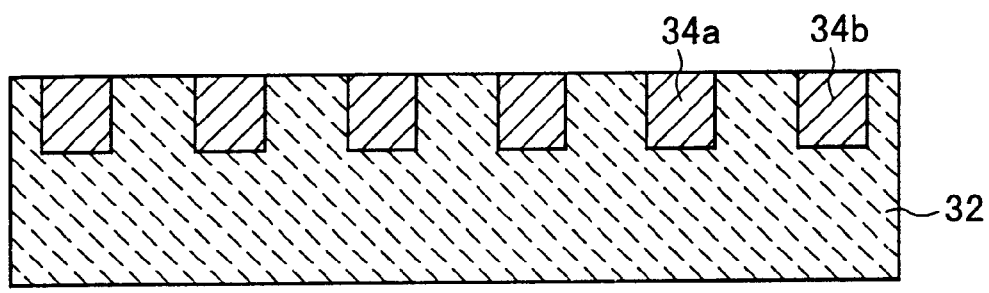
FIG. 10 shows a sectional view illustrating another example of the tiger skin type.
Figure 11:
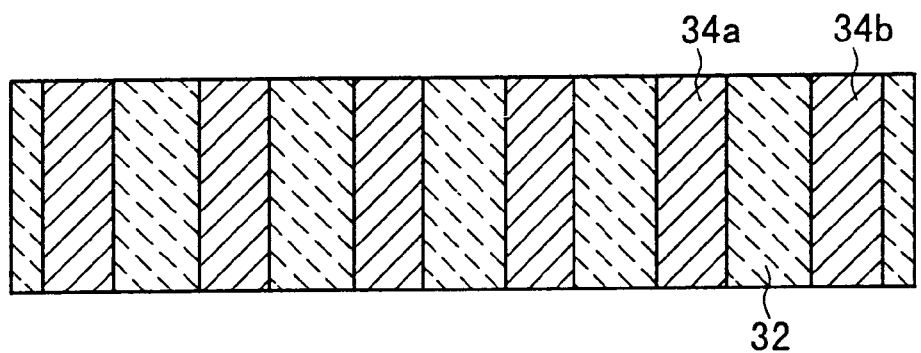
FIG. 11 shows a sectional view illustrating still another example of the tiger skin type.

Additionally, the types shown in FIGS. 10 and 11 are modified examples of the tiger skin type (see FIG. 8), having a structure in which the pair of electrodes 34a, 34b are embedded in the shape-retaining layer 32. These types are effective when the electric field is applied more uniformly in the depth direction of the shape-retaining layer 32.

Figure 12:
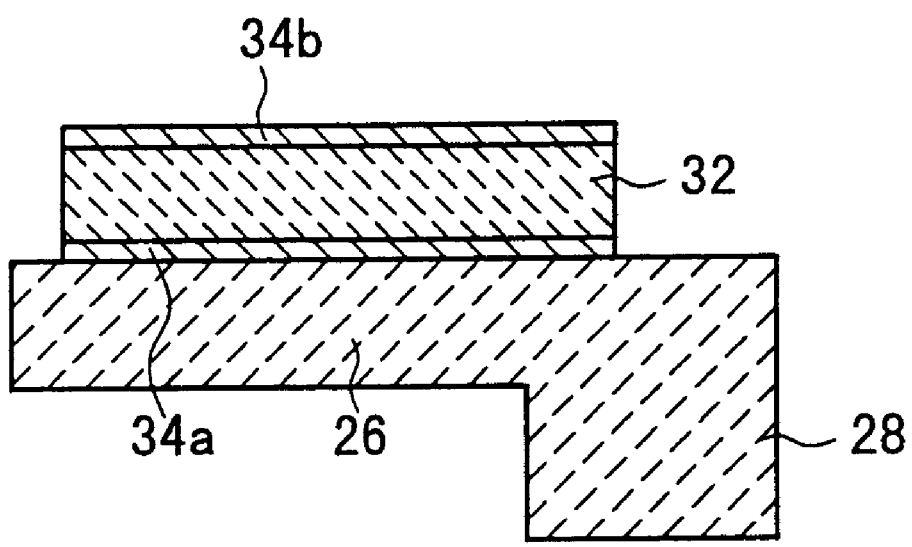
FIG. 12 shows a unimorph type actuator having a cantilever beam structure based on the sandwich type.
Figure 13:
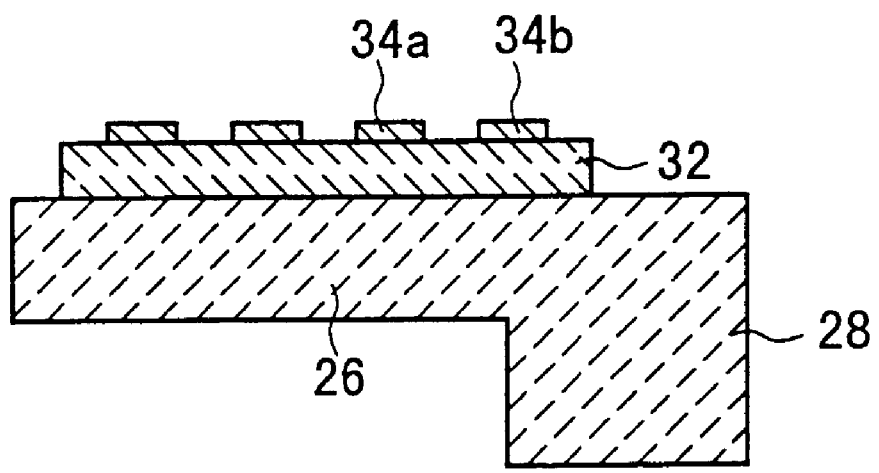
FIG. 13 shows a unimorph type actuator having a cantilever beam structure based on the tiger skin type.

FIGS. 12 and 13 show unimorph type actuators having the cantilever beam structure. The shape-retaining layer 32 of these actuators may be formed to range or not to range from the vibrating section 26 to the fixed section 28 of the substrate. However, the structure, in which the shape-retaining layer 32 ranges up to the fixed section 28, has increased rigidity and quick response, which is preferred.

Figure 14:
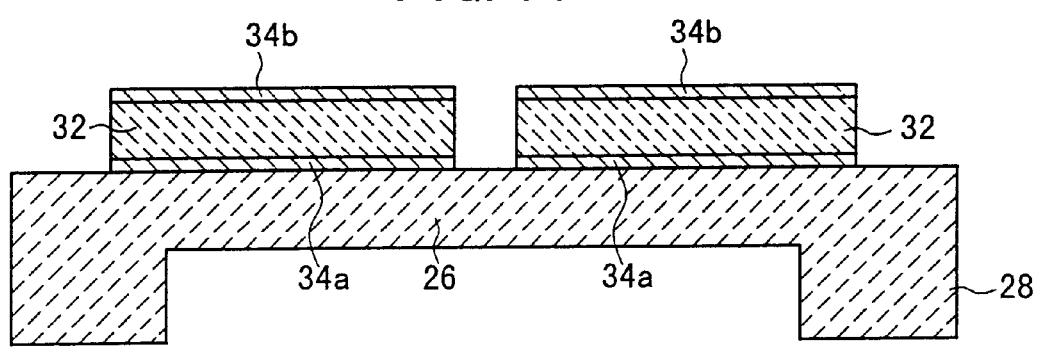
FIG. 14 shows a unimorph type actuator as composed of those having a cantilever beam structure in combination based on the sandwich type.
Figure 15:
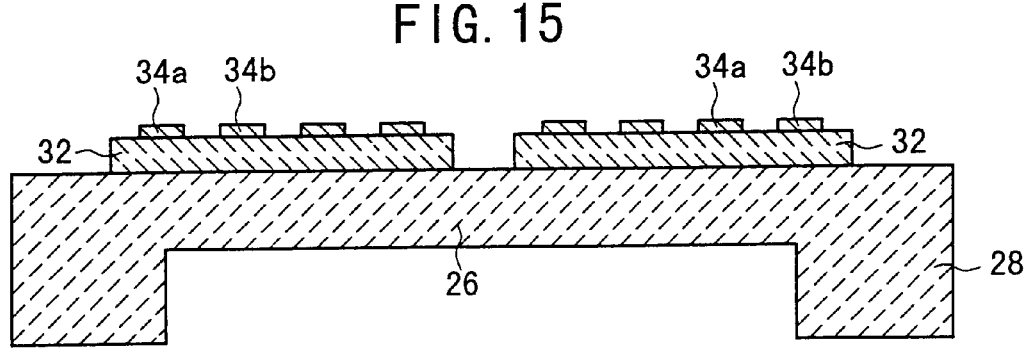
FIG. 15 shows a unimorph type actuator as composed of those having a cantilever beam structure in combination based on the tiger skin type.

FIGS. 14 and 15 show a structure type in which the unimorph type actuators having the cantilever beam structure are combined.

On the other hand, the displacement-transmitting section 18 includes a plate member 18a having a light-emitting element 50 provided on its upper surface, and a displacement-transmitting member 18b for transmitting the displacement of the actuator element 14 to the plate member 18a. The outer size of the plate member 18a is designed to be larger than the aperture of the light-transmitting section 20. A light-shielding section 52 is provided at the circumferential portion of the plate member 18a.

The light-shielding section 52 may be made of any material provided that it hardly transmits light or it does not transmit light, including, for example, metal, ceramics, rubber, organic resin, organic adhesive film, and glass which reflect or absorb light. Among them, those which transmit light may be colored by adding, for example, black pigment or dye, or they may be formed such that a thin film of, for example, metal or alloy of Cr, Al, Ni, Ag, Au, Cu, Pb, Zn, Sn, Pt or the like is formed on the surface so that light is not transmitted therethrough.

Preferably, the displacement-transmitting member 18b has a hardness of such an extent that the displacement of the actuator element 14 can be directly transmitted to the light-shielding plate 12. Therefore, those preferably usable as the material for the displacement-transmitting member 18b include, for example, rubber, organic resin, organic adhesive film, and glass. However, it is allowable to use the electrode layer itself, the piezoelectric element, or the material such as the ceramics as described above. It is most preferable to use organic resin or organic adhesive film based on, for example, epoxy, acrylic, silicone, and polyolefine. It is also effective to suppress the shrinkage upon curing by mixing them with a filler.

Those desirably used as the material for the plate member 18a include the materials for the displacement-transmitting member 18b described above as well as a material obtained by highly dispersing a ceramic powder having a high refractive index, for example, zirconia powder, titania powder, lead oxide powder, and mixed powder thereof, in organic resin based on, for example, epoxy, acrylic, and silicone, in view of the light emission efficiency and the maintenance of flatness. In this case, it is preferable to use the ratio of resin weight: ceramic powder weight=1: (0.1 to 10). Further, it is preferable to add, to the composition described above, a glass powder having an average grain diameter of 0.5 to 10 $\mu$m in a ratio of 1: (0.1 to 1.0) with respect to the ceramic powder, because the contact performance and the release performance are improved with respect to the surface of the light-shielding plate 12.

It is preferable for the plate member 18a and the light-shielding section 52 that the flatness or the smoothness of the portion (surface) to make contact with the light-shielding plate 12 is made sufficiently small as compared with the displacement amount of the actuator element 14. Specifically, it is not more than 1 $\mu$m, more preferably not more than 0.5 $\mu$m, and especially preferably not more than 0.1 $\mu$m. However, the flatness of the portion (surface) of the displacement-transmitting section 18 to make contact with the light-shielding plate 12 is important to decrease the gap in the state in which the displacement-transmitting section 18 contacts with the light-shielding plate 12. The flatness is not necessarily limited as described above provided that the contact portion makes deformation in the state of contact.

When the material as described above is used for the displacement-transmitting section 18, the displacement-transmitting section 18 may be connected to the actuator element 14 by stacking the displacement-transmitting section 18 made of the material as described above by using an adhesive. Alternatively, the displacement-transmitting section 18 may be formed on the upper portion of the actuator element 14, for example, by means of the method for coating a solution, a paste, or a slurry containing the material as described above.

When the displacement-transmitting section 18 is connected to the actuator element 14, it is preferable that the material for the displacement-transmitting member 18b also serves as an adhesive.

Explanation will now be made for the respective constitutive components except for the displacement-transmitting section 18 of the display device Da according to the first embodiment, especially, for example, for selection of materials for the respective constitutive components.

At first, the light-shielding plate 12 is constructed such that the first principal surface of the optical waveguide plate 60 for introducing the light from the light source and the inner wall surfaces of the respective light-transmitting sections 20 are shielded from light. Specifically, a metal thin film (shield film) 62, which is made of, for example, Cr, Al, or Ag, is formed on the first principal surface of the optical waveguide plate 60 and the inner wall surfaces of the respective light-transmitting sections 20 by using the plating method, sputtering method, or the vapor deposition method.

The material generally used for the optical waveguide plate 60 includes, for example, glass, quartz, light-transmissive plastics such as acrylic plastics, light-transmissive ceramics, structural materials comprising a plurality of layers composed of materials having different refractive indexes, and those provided with a surface coating layer.

Those usable for the light-emitting element 50 formed on the upper surface of the plate member 18a of the displacement-transmitting section 18 include, for example, the plate member 18a as well as fluorescent elements, scattering elements, and metals. Among them, when those which reflect light are used, for example, when the metal is used, it is preferable to use Cr, Al, and Ag, because the reflection factor is large. Even when the base material transmits or absorbs light, the light-emitting element 50 can be constructed by forming the fluorescent element, the scattering element, or the metal film as described above on the surface of the base material.

The light 10 to be introduced into the optical waveguide plate 60 of the light-shielding plate 12 may be any one of those of ultraviolet, visible, and infrared regions. Those usable as the light source include, for example, incandescent lamp, deuterium discharge lamp, fluorescent lamp, mercury lamp, metal halide lamp, halogen lamp, xenon lamp, tritium lamp, light emitting diode, laser, plasma light source, hot cathode tube, and cold cathode tube.

It is preferable that the vibrating section 26 is composed of a highly heat-resistant material, because of the following reason. That is, when the actuator element 14 has the structure in which the vibrating section 26 is directly supported by the fixed section 28 without using any material such as an organic adhesive which is inferior in heat resistance, the vibrating section 26 is preferably composed of a highly heat-resistant material in order that the vibrating section 26 is not deteriorated in quality at least during the formation of the shape-retaining layer 32.

It is preferable that the vibrating section 26 is composed of an electrically insulative material in order to electrically separate the wiring (for example, row selection line) connected to the row electrode 34a of the pair of electrodes 34 formed on the actuator substrate 22, from the wiring (for example, signal line) connected to the column electrode 34b.

Therefore, the vibrating section 26 may be composed of a material such as a highly heat-resistant metal and a porcelain enamel produced by coating a surface of such a metal with a ceramic material such as glass. However, the vibrating section 26 is optimally composed of ceramics.

Those usable as the ceramics for constructing the vibrating section 26 include, for example, stabilized zirconium oxide, aluminum oxide, magnesium oxide, titanium oxide, spinel, mullite, aluminum nitride, silicon nitride, glass, and mixtures thereof. Stabilized zirconium oxide is especially preferred because of, for example, high mechanical strength obtained even when the thickness of the vibrating section 26 is thin, high toughness, and small chemical reactivity with the shape-retaining layer 32 and the pair of electrodes 34. The term "stabilized zirconium oxide" includes stabilized zirconium oxide and partially stabilized zirconium oxide. Stabilized zirconium oxide has a crystal structure such as cubic crystal, and hence it does not cause phase transition.

On the other hand, zirconium oxide causes phase transition between monoclinic crystal and tetragonal crystal at about 1000° C. Cracks appear during the phase transition in some cases. Stabilized zirconium oxide contains 1 to 30 mole % of a stabilizer such as calcium oxide, magnesium oxide, yttrium oxide, scandium oxide, ytterbium oxide, cerium oxide, and oxides of rare earth metals. In order to enhance the mechanical strength of the vibrating section 26, the stabilizer preferably comprises yttrium oxide. In this composition, yttrium oxide is contained preferably in an amount of 1.5 to 6 mole %, and more preferably 2 to 4 mole %. It is preferable that aluminum oxide is further contained in an amount of 0.1 to 5 mole %.

The crystal phase may be, for example, a mixed phase of cubic crystal+monoclinic crystal, a mixed phase of tetragonal crystal+monoclinic crystal, and a mixed phase of cubic crystal+tetragonal crystal+monoclinic crystal. However, among them, most preferred are those having a principal crystal phase composed of tetragonal crystal or a mixed phase of tetragonal crystal+cubic crystal, from viewpoints of strength, toughness, and durability.

When the vibrating section 26 is composed of ceramics, a large number of crystal grains construct the vibrating section 26. In order to increase the mechanical strength of the vibrating section 26, the crystal grains preferably have an average grain diameter of 0.05 to 2 $\mu$m, and more preferably 0.1 to 1 $\mu$m.

The fixed section 28 is preferably composed of ceramics. The fixed section 28 may be composed of the same ceramic material as that used for the vibrating section 26, or the fixed section 28 may be composed of a ceramic material different from that used for the vibrating 26. Those usable as the ceramic material for constructing the fixed section 28 include, for example, stabilized zirconium oxide, aluminum oxide, magnesium oxide, titanium oxide, spinel, mullite, aluminum nitride, silicon nitride, glass, and mixtures thereof, in the same manner as the material for the vibrating section 26.

Especially, those preferably adopted for the actuator substrate 22 used in the display device Da according to the first embodiment include, for example, materials containing a major component of zirconium oxide, materials containing a major component of aluminum oxide, and materials containing a major component of a mixture thereof. Among them, those containing a major component of zirconium oxide are more preferable.

Clay or the like is added as a sintering aid in some cases. However, it is necessary to control components of the sintering aid in order not to contain an excessive amount of those liable to form glass such as silicon oxide and boron oxide because of the following reason. That is, although the materials which are liable to form glass are advantageous to join the actuator substrate 22 to the shape-retaining layer 32, the materials facilitate the reaction between the actuator substrate 22 and the shape-retaining layer 32, making it difficult to maintain a predetermined composition of the shape-retaining layer 32. As a result, the materials cause deterioration of the element characteristics.

That is, it is preferable that silicon oxide or the like in the actuator substrate 22 is restricted to have a weight ratio of not more than 3%, and more preferably not more than 1%. The term "major component" herein refers to a component which exists in a proportion of not less than 50% in weight ratio.

As described above, those usable as the shape-retaining layer 32 include piezoelectric/electrostrictive layers and anti-ferroelectric layers. However, when the piezoelectric/electrostrictive layer is used as the shape-retaining layer 32, those usable as the piezoelectric/electrostrictive layer include ceramics containing, for example, lead zirconate, lead magnesium niobate, lead nickel niobate, lead zinc niobate, lead manganese niobate, lead magnesium tantalate, lead nickel tantalate, lead antimony stannate, lead titanate, barium titanate, lead magnesium tungstate, and lead cobalt niobate, or any combination of them.

It is needless to say that the major component contains the compound as described above in an amount of not less than 50% by weight. Among the ceramic materials described above, the ceramic material containing lead zirconate is most frequently used as the constitutive material for the piezoelectric/electrostrictive layer for constructing the shape-retaining layer 32.

When the piezoelectric/electrostrictive layer is composed of ceramics, it is also preferable to use ceramics obtained by appropriately adding, to the ceramics described above, oxide of, for example, lanthanum, calcium, strontium, molybdenum, tungsten, barium, niobium, zinc, nickel, and manganese, or any combination thereof or another type of compound thereof.

For example, it is preferable to use ceramics containing a major component composed of lead magnesium niobate, lead zirconate, and lead titanate and further containing lanthanum and strontium.

The piezoelectric/electrostrictive layer may be either dense or porous. When the piezoelectric/electrostrictive layer is porous, its porosity is preferably not more than 40%.

When the anti-ferroelectric layer is used as the shape-retaining layer 32, it is desirable to use, as the anti-ferroelectric layer, a compound containing a major component composed of lead zirconate, a compound containing a major component composed of lead zirconate and lead stannate, a compound obtained by adding lanthanum oxide to lead zirconate, and a compound obtained by adding lead zirconate and lead niobate to a component composed of lead zirconate and lead stannate.

Especially, when an anti-ferroelectric film, which contains lead zirconate and lead stannate as represented by the following composition, is applied as a film-type element such as the actuator element 14, it is possible to perform driving at a relatively low voltage. Therefore, application of such an anti-ferroelectric film is especially preferred.

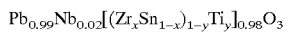

$$Pb_{0.99}Nb_{0.02}[(Zr_xSn_{1-x})_{1-y}Ti_y]_{0.98}O_3$$

wherein, $0.5<x<0.6$, $0.05<y<0.063$, $0.01<Nb<0.03$.

The anti-ferroelectric film may be porous. When the anti-ferroelectric film is porous, it is desirable that the porosity is not more than 30%.

It is preferable that the thickness of the vibrating section 26 of the actuator substrate 22 has a dimension identical to that of the thickness of the shape-retaining layer 32 formed on the vibrating section 26, because of the following reason. That is, if the thickness of the vibrating section 26 is extremely thicker than the thickness of the shape-retaining layer 32 (if the former is different from the latter by not less than one figure), when the shape-retaining layer 32 makes shrinkage upon sintering, the vibrating section 26 behaves to inhibit the shrinkage. For this reason, the stress at the boundary surface between the shape-retaining layer 32 and the actuator substrate 22 is increased, and consequently they are easily peeled off from each other. On the contrary, when the dimension of the thickness is in an identical degree between the both, it is easy for the actuator substrate 22 (vibrating section 26) to follow the shrinkage of the shape-retaining layer 32 upon sintering. Accordingly, such dimension of the thickness is preferred to achieve integration. Specifically, the vibrating section 26 preferably has a thickness of 1 to 100 μm, more preferably 3 to 50 μm, and much more preferably 5 to 20 μm. On the other hand, the shape-retaining layer 32 preferably has a thickness of 5 to 100 μm, more preferably 5 to 50 μm, and much more preferably 5 to 30 μm.

The pair of electrodes 34 formed on the shape-retaining layer 32 are allowed to have an appropriate thickness depending on the use or application. However, the thickness is preferably 0.01 to 50 μm, and more preferably 0.1 to 5 μm. The pair of electrodes 34 are preferably composed of a conductive metal which is solid at room temperature. The metal includes, for example, metal simple substances or alloys containing, for example, aluminum, titanium, chromium, iron, cobalt, nickel, copper, zinc, niobium, molybdenum, ruthenium, rhodium, silver, stannum, tantalum, tungsten, iridium, platinum, gold, and lead. It is needless to say that these elements may be contained in an arbitrary combination.

Next, the operation of the display device Da according to the first embodiment will be explained with reference to FIG. 1.

At first, for example, when all of the actuator elements 14 are in the natural state, i.e., when all of the actuator elements 14 do not make the displacement action in the direction to make approach to the light-shielding plate 12, the light is introduced, for example, from the lateral end of the optical waveguide plate 60. In this state, the first principal surface of the optical waveguide plate 60 and the inner wall surfaces of the light-transmitting sections 20 are shielded from light by the metal thin film 62. Therefore, the introduced light is leaked through the second principal surface of the optical waveguide plate 60. The leakage light is radiated onto the light-emitting element 50 which is formed on the upper surface of the displacement-transmitting section 18. The light behaves as the transmitted light which passes through the light-transmitting section 20, and it is radiated from the first principal surface of the optical waveguide plate 60 (light-shielding plate 12). That is, all of the picture elements are in the light emission state. In this embodiment, a metal film may be formed on the surface of the light-shielding section 52 so that the light is efficiently introduced into the light-emitting element 50. By doing so, it is possible to realize improvement in brightness.

When a specified picture element is selected in response to the input signal such as an image signal, then the actuator element 14 corresponding to the concerning picture element makes the displacement action toward the back surface of the light-shielding plate 12, and the upper surface (light-shielding section 52 at the circumferential portion) of the plate member 18a of the corresponding displacement-transmitting section 18 contacts with the back surface of the light-shielding plate 12. In this state, the light-emitting element 50, which is formed on the upper surface of the corresponding plate member 18a, is inserted into the corresponding light-transmitting section 20.

Accordingly, the light, which has been radiated from the light-emitting element 50, is intercepted by the contact between the plate member 18a and the light-shielding plate 12. As a result, no light is radiated from the concerning light-transmitting section 20. That is, the concerning picture element is in the light off state.

Therefore, the actuator element 14 and the displacement-transmitting section 18 function as a shutter means for selectively shielding the light-transmitting section 20. The light-shielding section 52, which is provided at the circumferential portion of the plate member 18a of the displacement-transmitting section 18, constitutes a shutter mechanism which is driven by the shutter means.

On the contrary, when all of the actuator elements 14 are displaced toward the light-shielding plate 12, and the light-intercepting operation is performed for all of the light-transmitting sections 20, then the light is intercepted by the contact between the light-shielding section 52 and the light-shielding plate 12, giving a state in which no light is radiated from the first principal surface of the light-shielding plate 12 at all. That is, the black background is displayed. At this stage, when a specified picture element is selected in response to the input signal, then the actuator element 14 corresponding to the concerning picture element is restored to the original natural state, and the light-intercepting operation is stopped for the light-transmitting section 20 corresponding to the concerning picture element. Accordingly, the light passes through the light-transmitting section 20, and it is transmitted through the light-shielding plate 12. Thus, the light is radiated from the portion of the first principal surface of the light-shielding plate 12 corresponding to the concerning light-transmitting section 20.

That is, in the display device Da according to the first embodiment, the light-emitting section 130 composed of the light-emitting element 50 for radiating the light to the light-transmitting section 20 of the light-shielding plate 12, and the shutter section 132 composed of the actuator element 14 and the displacement-transmitting section 18 for selectively intercepting the light radiation through the light-transmitting section 20 are integrated into one unit.

As described above, the presence or absence of light emission radiated at the front surface of the light-shielding plate 12 can be controlled depending on the presence or absence of the contact of the displacement-transmitting section 18 disposed at the back of the light-shielding plate 12. Especially, in the display device Da according to the first embodiment, one unit for making the displacement action of the displacement-transmitting section 18 in the direction to make contact or separation with respect to the light-shielding plate 12 may be recognized as one picture element. A large number of the picture elements are arranged in a matrix configuration or in a zigzag configuration concerning the respective rows. Therefore, it is possible to display a picture image (characters and graphics) corresponding to the image signal on the front surface of the light-shielding plate 12, in the same manner as in the cathode ray tube and the liquid crystal display device, by controlling the displacement action in each of the picture elements in accordance with the attribute of the inputted image signal.

Figure 16A:
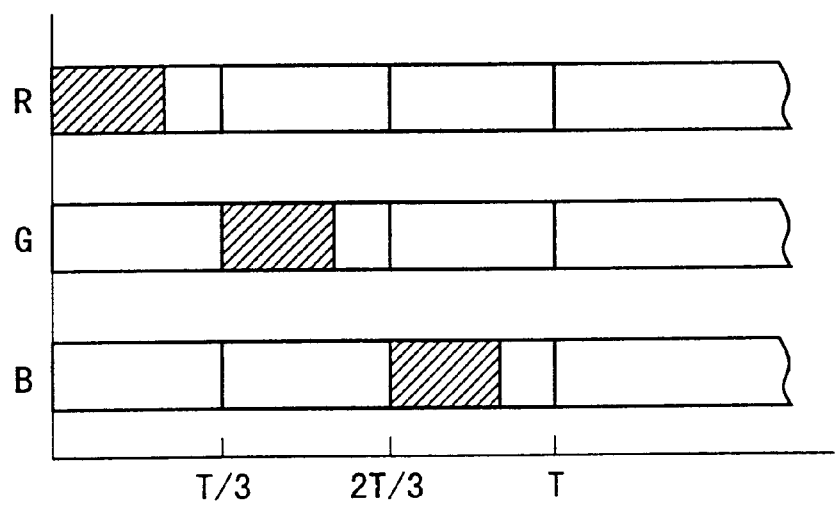
FIG. 16A shows a timing chart illustrating a case in which the ratio of RGB light emission time is 1:1:1 when the present invention is applied to a color display system.
Figure 16B:
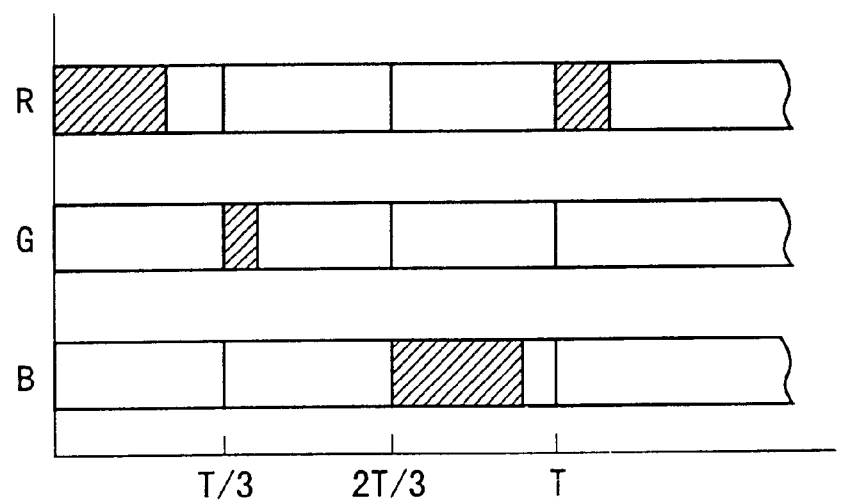
FIG. 16B shows a timing chart illustrating a case in which the ratio of RGB light emission time is 4:1:5 when the present invention is applied to a color display system.

Explanation will now be made for the procedure for the color display. The principle of the color development to be effected by the display device Da according to the first embodiment can be specified by the system of mixing R (red), G (green), and B (blue) which are the three primary colors, in the same manner as in the presently used color display system. It is now assumed that the color development cycle is T, and the maximum light emission time of RGB is divided into three. As shown in FIG. 16A, when the ratio of RGB light emission time is 1:1:1, the white light is obtained. As shown in FIG. 16B, when the ratio of RGB light emission time is 4:1:5, a neutral color corresponding to the ratio is obtained. Therefore, the color development time is controlled as follows. That is, the light emission time for the three primary colors may be controlled while synchronizing the contact time between the light-shielding plate 12 and the displacement-transmitting section 18 with the color development cycle T. Alternatively, the contact time between the light-shielding plate 12 and the displacement-transmitting section 18 may be controlled while synchronizing the light emission time for the three primary colors with the color development cycle T.

In this viewpoint, the present invention is advantageous in that it is unnecessary to increase the number of picture elements as compared with the black-and white screen, even in the case of the application to the color display system. The changeover of RGB can be realized by using a mechanical shutter or ON/OFF operation of a switch.

Other methods are also available for the color display. For example, it is preferable to construct one picture element by using three light-transmitting sections adjacent to one another (RGB arrangement) or four light-transmitting sections adjacent to one another (checked arrangement or the like), for example, depending on the relation to the color scheme of the color layer (for example, three primary color filters, complementary color filters, color scattering elements), by using, for example, the unit of several picture elements at positions corresponding to the light-transmitting sections 20 respectively on the first principal surface of the light-shielding plate 12. The term "color scattering element" referred to herein is an opaque element obtained, for example, by dispersing a dyestuff such as a pigment in a resin or the like.

In this embodiment, the scattered light can be colored by using the color layer even when the light source is not switched. Therefore, it is unnecessary to display a plurality of images during the period of prescribed one field. Therefore, it is possible to give a margin to the operation timing. Accordingly, a sufficient response can be obtained even when an actuator element having a slow response speed is used as the actuator element 14. Further, it is possible to realize high brightness and reduce the production cost and the electric power consumption.

Usually, in the case of the display apparatus such as CRT, the black level differs between the black background display on the screen obtained when the device is not in the operation state (state in which the power source is shut off) and the black background display obtained when the device is in the operation state. This difference is caused by the minute light radiation from portions other than the picture elements in the operation state, which results in a decrease in contrast.

On the other hand, in the display device Da according to the first embodiment, it is premised that the light is firstly intercepted by the light-shielding plate 12. The light is selectively radiated only through the large number of light-transmitting sections 20 specifically provided for the light-shielding plate 12.

Therefore, no light is radiated from any portion other than the light-transmitting section 20. Further, there is no leakage light at all toward the first principal surface, which would be otherwise caused by any defect or the like of the optical waveguide plate 60. It is possible to efficiently utilize the light 10 introduced into the optical waveguide plate 60. The black level of the black background display on the screen obtained when the device is not in the operation state is approximately the same as that of the black background display obtained when the device is in the operation state. This feature contributes to the improvement in contrast, and it results in the improvement in image quality of the displayed image as well.

Further, the light-shielding plate 12 is superimposed with the actuator substrate 22 formed with the actuator element 14 and the displacement-transmitting section 18 for each of the picture elements. In this manner, those having the flat configurations are superimposed with each other. Thus, the display device Da is constructed, which is provided with the light-emitting section 130 and the shutter section 132. Therefore, the present invention is advantageous to realize the highly integrated, minute, fine, mass-producible, and uniform display device Da.

Next, a display device Db according to the second embodiment will be explained with reference to FIG. 17. Components or parts corresponding to those shown in FIG. 1 are designated by the same reference numerals, duplicate explanation of which will be omitted.

Figure 17:
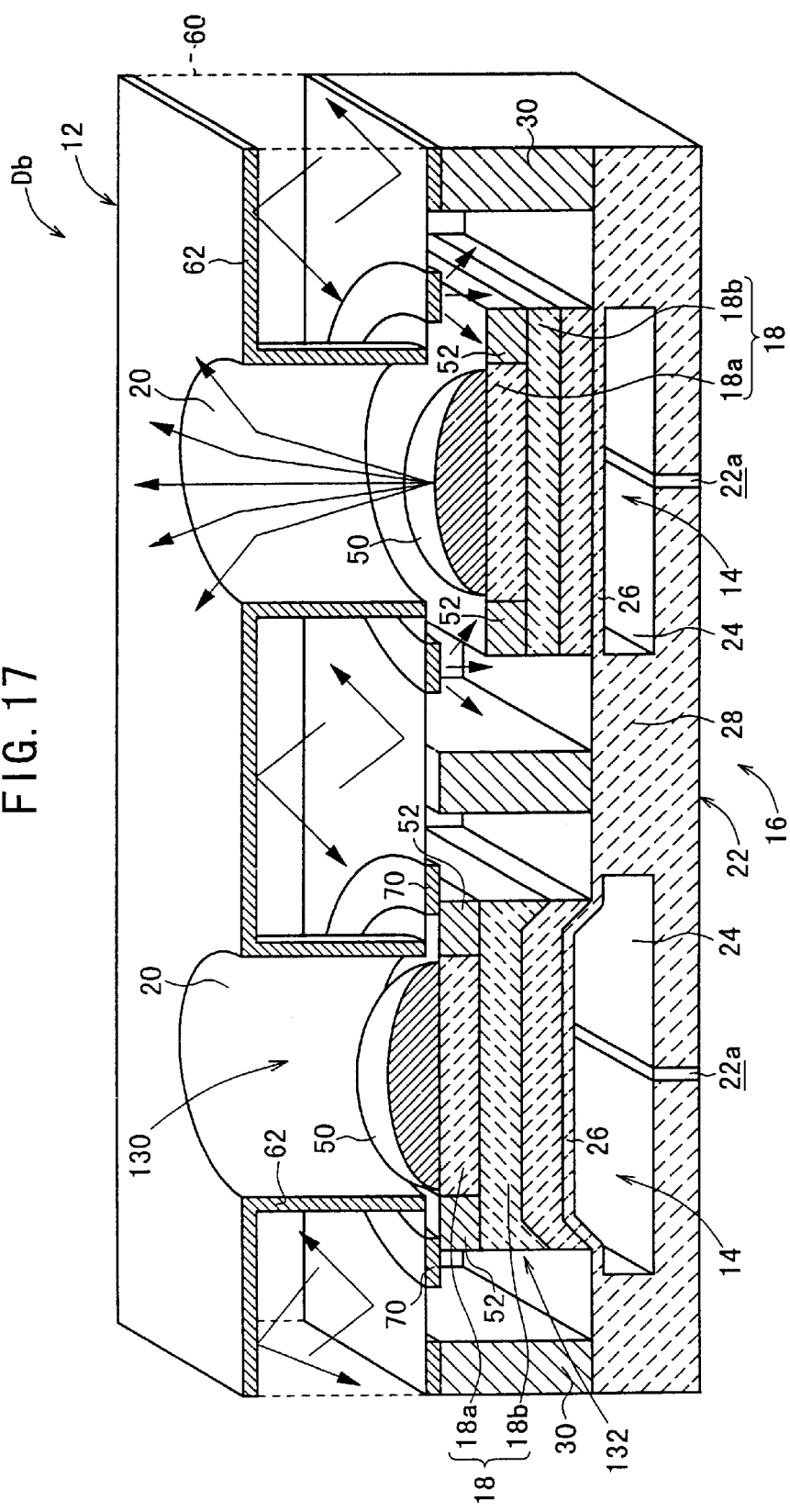
FIG. 17 shows an arrangement illustrating a display device according to a second embodiment.

As shown in FIG. 17, the display device Db according to the second embodiment is constructed in approximately the same manner as in the display device Da according to the first embodiment (see FIG. 1). However, the former is different from the latter in that a ring-shaped mediating element 70 is provided in the vicinity of each of the light-transmitting sections 20 through the second principal surface of the optical waveguide plate 60 for constructing the light-shielding plate 12, for more actively releasing the light introduced into the optical waveguide plate 12 as the leakage light. The mediating element 70 may be composed of, for example, a scattering element or a fluorescent element.

The operation of the display device Db according to the second embodiment will be briefly explained with reference to FIG. 17. At first, the light is introduced, for example, from the lateral end of the optical waveguide plate 60. In this embodiment, all of the light is totally reflected at the inside of the optical waveguide plate 60 without being transmitted through the front surface and the back surface thereof by controlling the magnitude of the refractive index of the optical waveguide plate 60. The refractive index "n" of the optical waveguide plate 60 is desirably 1.3 to 1.8, and more desirably 1.4 to 1.7.

A part of the totally reflected light passes through the mediating element 70, and it is radiated as the leakage light from the second principal surface of the optical waveguide plate 60. The leakage light is radiated onto the light-emitting element 50 which is formed on the upper surface of the displacement-transmitting section 18, and it behaves as the transmitted light. The light passes through the light-transmitting section 20, and it is radiated from the first principal surface of the optical waveguide plate 60 (light-shielding plate 12). That is, all of the picture elements are in the light emission state. In this embodiment, a metal film may be formed on the surface of the light-shielding section 52 so that the light is efficiently introduced into the light-emitting element 50, making it possible to realize the improvement in brightness.

When a specified picture element is selected in response to the input signal such as an image signal, the actuator element 14 corresponding to the concerning picture element makes the displacement action toward the back surface of the light-shielding plate 12. The upper surface (light-shielding section 52 at the circumferential portion) of the plate member 18a of the corresponding displacement-transmitting section 18 contacts with the mediating element 70. In this state, the light-emitting element 50, which is formed on the upper surface of the corresponding plate member 18a, is inserted into the corresponding light-transmitting section 20.

Accordingly, the light, which has been radiated from the light-emitting element 50, is intercepted by the contact between the light-shielding section 52 and the mediating element 70. The light is not radiated from the concerning light-transmitting section 20. That is, the concerning picture element is in the light off state.

As described above, also in the display device Db according to the second embodiment, no light is radiated from any portion other than the light-transmitting section 20. Further, there is no leakage light at all toward the first principal surface, which would be otherwise caused by any defect or the like of the optical waveguide plate 60. It is possible to efficiently utilize the light 10 introduced into the optical waveguide plate 60. The black level of the black background display on the screen obtained when the device is not in the operation state is approximately the same as that of the black background display obtained when the device is in the operation state. This feature contributes to the improvement in contrast, and it results in the improvement in image quality of the displayed image as well.

Next, a display device Dc according to the third embodiment will be explained with reference to FIG. 18. Components or parts corresponding to those shown in FIG. 17 are designated by the same reference numerals, duplicate explanation of which will be omitted.

Figure 18:
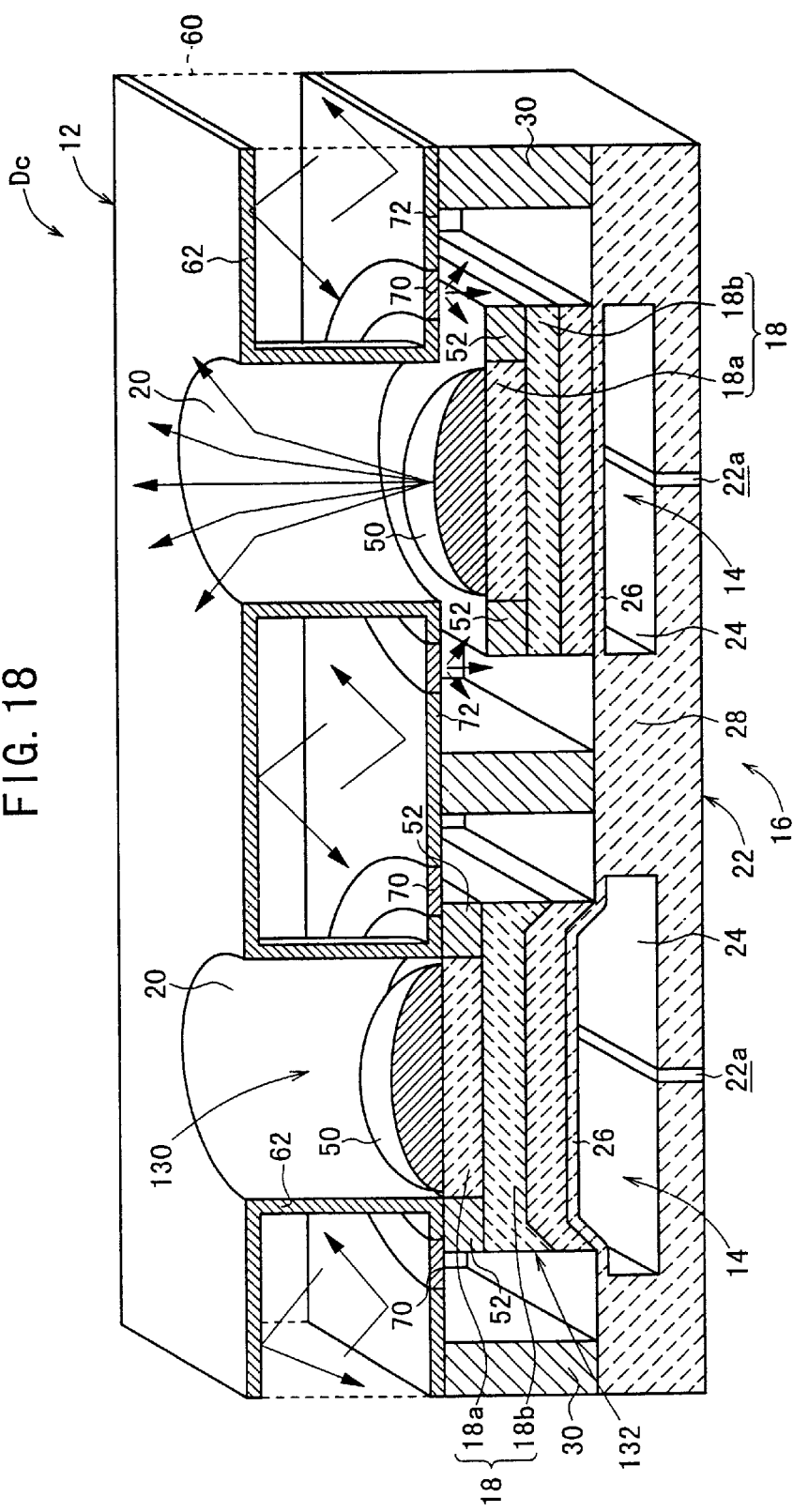
FIG. 18 shows an arrangement illustrating a display device according to a third embodiment.

As shown in FIG. 18, the display device Dc according to the third embodiment is constructed in approximately the same manner as in the display device Db according to the second embodiment (see FIG. 17). However, the former is different from the latter in that a metal thin film (shield film) 72 made of, for example, Cr, Al, or Ag is formed by using the plating method, the sputtering method, or the vapor deposition method on portions of the second principal surface of the optical waveguide plate 60 except for the mediating elements 70. It is preferable that the metal thin film 72 is mirror-finished.

The operation of the display device Dc according to the third embodiment will be briefly explained with reference to FIG. 18. At first, the light is introduced, for example, from the lateral end of the optical waveguide plate 60. In this embodiment, the light introduced into the optical waveguide plate 60 is totally reflected by the metal thin films 62, 72 formed on the first principal surface and the second principal surface of the optical waveguide plate 60. A part of the totally reflected light passes through the mediating element 70 which is provided at the second principal surface of the optical waveguide plate 60, and it is radiated as the leakage light from the second principal surface of the optical waveguide plate 60. The leakage light is radiated onto the light-emitting element 50 which is formed on the upper surface of the displacement-transmitting section 18, and it behaves as the transmitted light. The light passes through the light-transmitting section 20, and it is radiated from the first principal surface of the optical waveguide plate 60 (light-shielding plate 12). That is, all of the picture elements are in the light emission state. In this embodiment, a metal film may be formed on the surface of the light-shielding section 52 so that the light is efficiently introduced into the light-emitting element 50, making it possible to realize the improvement in brightness.

When a specified picture element is selected in response to the input signal such as an image signal, the actuator element 14 corresponding to the concerning picture element makes the displacement action toward the back surface of the light-shielding plate 12. The upper surface (light-shielding section 52 at the circumferential portion) of the plate member 18a of the corresponding displacement-transmitting transmitting section 18 contacts with the mediating element 70 and the metal thin film 72. In this state, the light-emitting element 50, which is formed on the upper surface of the corresponding plate member 18a, is inserted into the corresponding light-transmitting section 20.

Accordingly, the light, which has been radiated from the light-emitting element 50, is intercepted by the contact between the light-shielding section 52 and the mediating element 70 and the metal thin film 72. The light is not radiated from the concerning light-transmitting section 20. That is, the concerning picture element is in the light off state.

As described above, also in the display device Dc according to the third embodiment, no light is radiated from any portion other than the light-transmitting section 20, in the same manner as in the display device Db according to the second embodiment described above. Further, there is no leakage light at all toward the first principal surface, which would be otherwise caused by any defect or the like of the optical waveguide plate 60. It is possible to efficiently utilize the light 10 introduced into the optical waveguide plate 60. The black level of the black background display on the screen obtained when the device is not in the operation state is approximately the same as that of the black background display obtained when the device is in the operation state. This feature contributes to the improvement in contrast, and it results in the improvement in image quality of the displayed image as well.

Next, a display device Dd according to the fourth embodiment will be explained with reference to FIG. 19. Components or parts corresponding to those shown in FIG. 1 are designated by the same reference numerals, duplicate explanation of which will be omitted.

Figure 19:
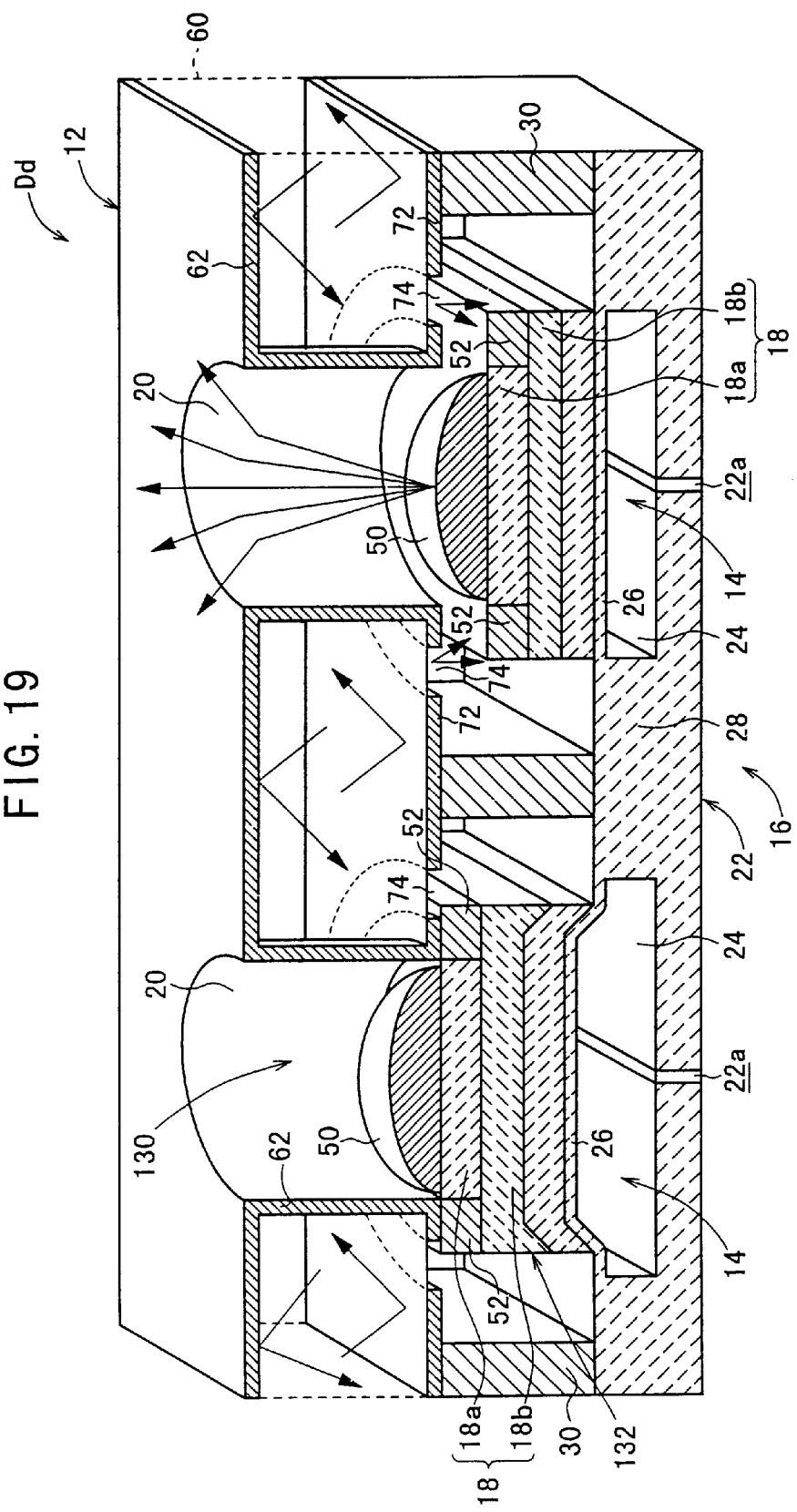
FIG. 19 shows an arrangement illustrating a display device according to a fourth embodiment.

As shown in FIG. 19, the display device Dd according to the fourth embodiment is constructed in approximately the same manner as in the display device Da according to the first embodiment (see FIG. 1). However, the former is different from the latter in that a portion of the second principal surface of the optical waveguide plate 60 in the vicinity of the light-transmitting section 20 is formed as an exposed section 74 of the optical waveguide plate 60, and a metal thin film (shield film) 72 made of, for example, Cr, Al, or Ag is formed by using the plating method, the sputtering method, or the vapor deposition method on portions except for the exposed sections 74. That is, the exposed sections 74 of the second principal surface of the optical waveguide plate 60, on which the metal thin film 72 is not formed, are portions at which the second principal surface of the optical waveguide plate 60 is exposed. It is preferable that the metal thin film 72 is mirror-finished.

The operation of the display device Dd according to the fourth embodiment will be briefly explained with reference to FIG. 19. At first, the light is introduced, for example, from the lateral end of the optical waveguide plate 60. In this embodiment, the light introduced into the optical waveguide plate 60 is totally reflected by the metal thin films 62, 72 formed on the first principal surface and the second principal surface of the optical waveguide plate 60. A part of the totally reflected light passes through the exposed section 74 which is provided at the second principal surface of the optical waveguide plate 60, and it is radiated as the leakage light from the second principal surface of the optical waveguide plate 60. The leakage light is radiated onto the light-emitting element 50 which is formed on the upper surface of the displacement-transmitting section 18, and it behaves as the transmitted light. The light passes through the light-transmitting section 20, and it is radiated from the first principal surface of the optical waveguide plate 60 (light-shielding plate 12). That is, all of the picture elements are in the light emission state. In this embodiment, a metal film may be formed on the surface of the light-shielding section 52 so that the light is efficiently introduced into the light-emitting element 50, making it possible to realize the improvement in brightness.

When a specified picture element is selected in response to the input signal such as an image signal, the actuator element 14 corresponding to the concerning picture element makes the displacement action toward the back surface of the light-shielding plate 12. The upper surface (light-shielding section 52 at the circumferential portion) of the plate member 18a of the corresponding displacement-transmitting section 18 contacts with the metal thin film 72. In this state, the light-emitting element 50, which is formed on the upper surface of the corresponding plate member 18a, is inserted into the corresponding light-transmitting section 20.

Accordingly, the light, which has been radiated from the light-emitting element 50, is intercepted by the contact between the light-shielding section 52 and the metal thin film 72. The light is not radiated from the concerning light-transmitting section 20. That is, the concerning picture element is in the light off state.

As described above, also in the display device Dd according to the fourth embodiment, no light is radiated from any portion other than the light-transmitting section 20, in the same manner as in the display device Da according to the first embodiment described above. Further, there is no leakage light at all toward the first principal surface, which would be otherwise caused by any defect or the like of the optical waveguide plate 60. It is possible to efficiently utilize the light 10 introduced into the optical waveguide plate 60. The black level of the black background display on the screen obtained when the device is not in the operation state is approximately the same as that of the black background display obtained when the device is in the operation state. This feature contributes to the improvement in contrast, and it results in the improvement in image quality of the displayed image as well.

Next, a display device De according to the fifth embodiment will be explained with reference to FIG. 20. Components or parts corresponding to those shown in FIG. 1 are designated by the same reference numerals, duplicate explanation of which will be omitted.

Figure 20:
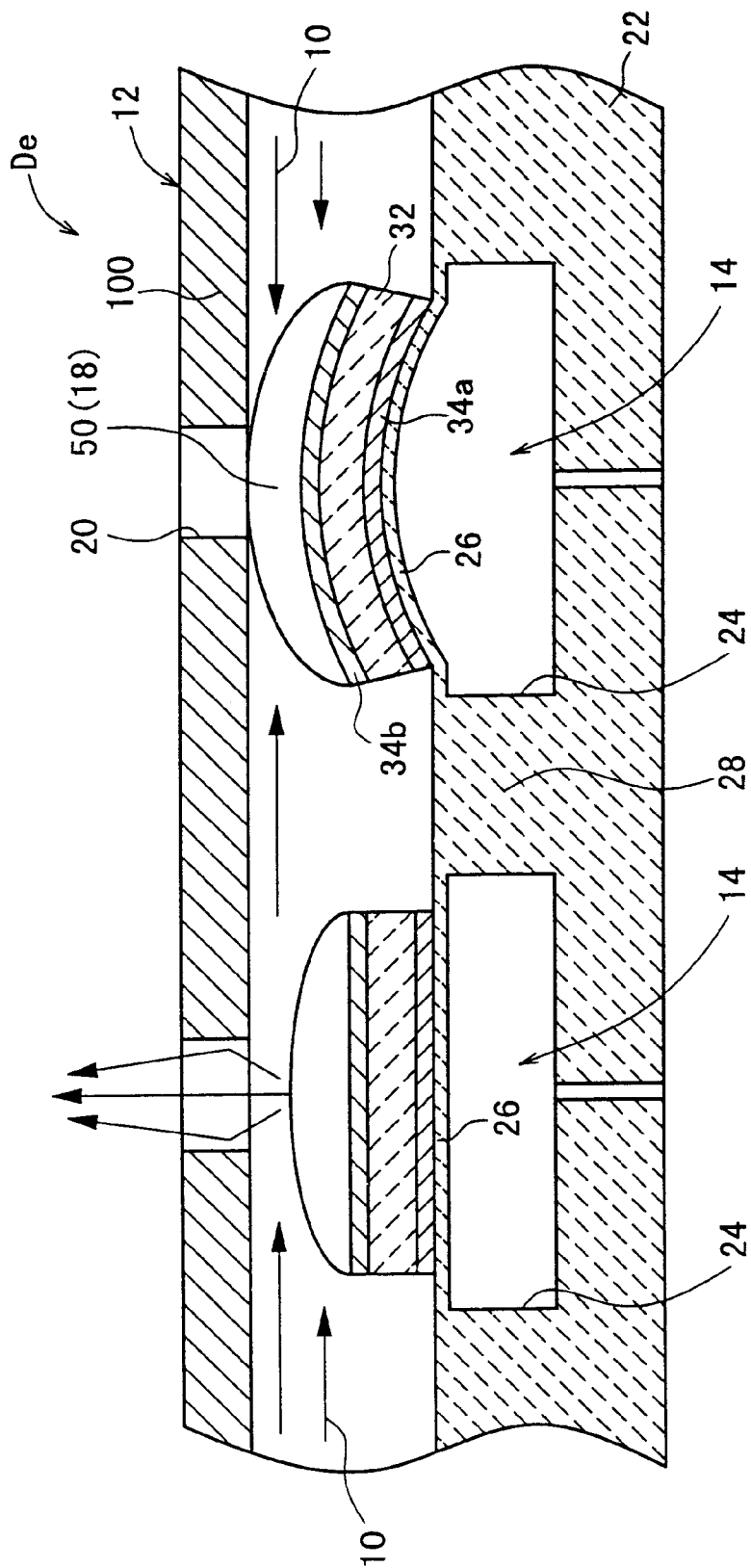
FIG. 20 shows an arrangement illustrating a display device according to a fifth embodiment.

As shown in FIG. 20, the display device De according to the fifth embodiment is constructed in approximately the same manner as in the display device Da according to the first embodiment (see FIG. 1). However, the former is different from the latter in the following points. That is, the light-shielding plate 12 is composed of a metal plate 100. The electrode structure of the actuator element 14 is the sandwich structure comprising a lower electrode 34a and an upper electrode 34b. The light 10 from the light source is introduced into a space between the actuator substrate 22 and the metal plate 100. A displacement-transmitting section 18 itself constitutes a light-emitting element 50 and a light-shielding section 52.

The operation of the display device De according to the fifth embodiment will be briefly explained. At first, when the light 10 is introduced into the space between the actuator substrate 22 and the metal plate 100, the light 10 is reflected between the actuator substrate 22 and the metal plate 100. A part of the reflected light 10 is radiated onto the displacement-transmitting section 18 (constituting the light-emitting element 50), and the light behaves as the transmitted light. The light passes through the light-transmitting section 20, and it is radiated from the first principal surface of the metal plate 100. That is, all of the picture elements are in the light emission state.

When a specified picture element is selected in response to the input signal such as an image signal, the actuator element 14 corresponding to the concerning picture element makes the displacement action toward the back surface of the metal plate 100. The corresponding displacement-transmitting section 18 contacts with the second principal surface of the metal plate 100.

Accordingly, the light, which has been radiated from the concerning displacement-transmitting section 18 (light-emitting element 50), is intercepted by the contact between the concerning displacement-transmitting section 18 and the metal plate 100. The light is not radiated from the concerning light-transmitting section 20. That is, the concerning picture element is in the light off state.

Also in the display device De according to the fifth embodiment, no light is radiated from any portion other than the light-transmitting section 20. The black level of the black background display on the screen obtained when the device is not in the operation state is approximately the same as that of the black background display obtained when the device is in the operation state. This feature contributes to the improvement in contrast, and it results in the improvement in image quality of the displayed image as well.

In this embodiment, it is desirable for the metal plate 100 that at least the surface (second principal surface), which is disposed on the side of the actuator element 14, is mirror-finished, because of the following reason. That is, the light 10 from the light source is introduced into the space between the actuator substrate 22 and the metal plate 100. Therefore, it is intended that the light 10 is reflected by the surface of the metal plate 100 to decrease the attenuation. This arrangement is also advantageous in that when the displacement-transmitting section 18 contacts with the metal plate 100, the contact state therebetween is made appropriate, i.e., the light 10 can be intercepted in a well suited manner.

A metal film (not shown) may be formed on the second principal surface of the metal plate 100 by means of, for example, sputtering, vapor deposition, or metal plating in order to facilitate the reflection of light. In view of this fact, the metal plate 100 is used as the light-shielding plate 12 in the embodiment described above. However, there is no limitation to the metal. The material having any quality may be used provided that the light-transmitting section 20 can be formed. For example, it is also preferable to use those which transmit light (for example, ceramics, glass, plastic, and crystal matter).

As for the displacement-transmitting section 18, it is preferable that a metal film is formed on the surface or it is made of a metal or the like, in order that the light leaked through the light-transmitting section 20 is intercepted, and the light is radiated (reflected or scattered) through the light-transmitting section 20 during the light emission.

As for the actuator substrate 22, it is more preferable that a metal film is formed thereon in order to facilitate the reflection of introduced light in the same manner as in the light-shielding plate 12. However, in this arrangement, it is necessary to effect insulation for the wiring and the electrode.

Next, a display device Df according to the sixth embodiment will be explained with reference to FIG. 21. Components or parts corresponding to those shown in FIG. 20 are designated by the same reference numerals, duplicate explanation of which will be omitted.

Figure 21:
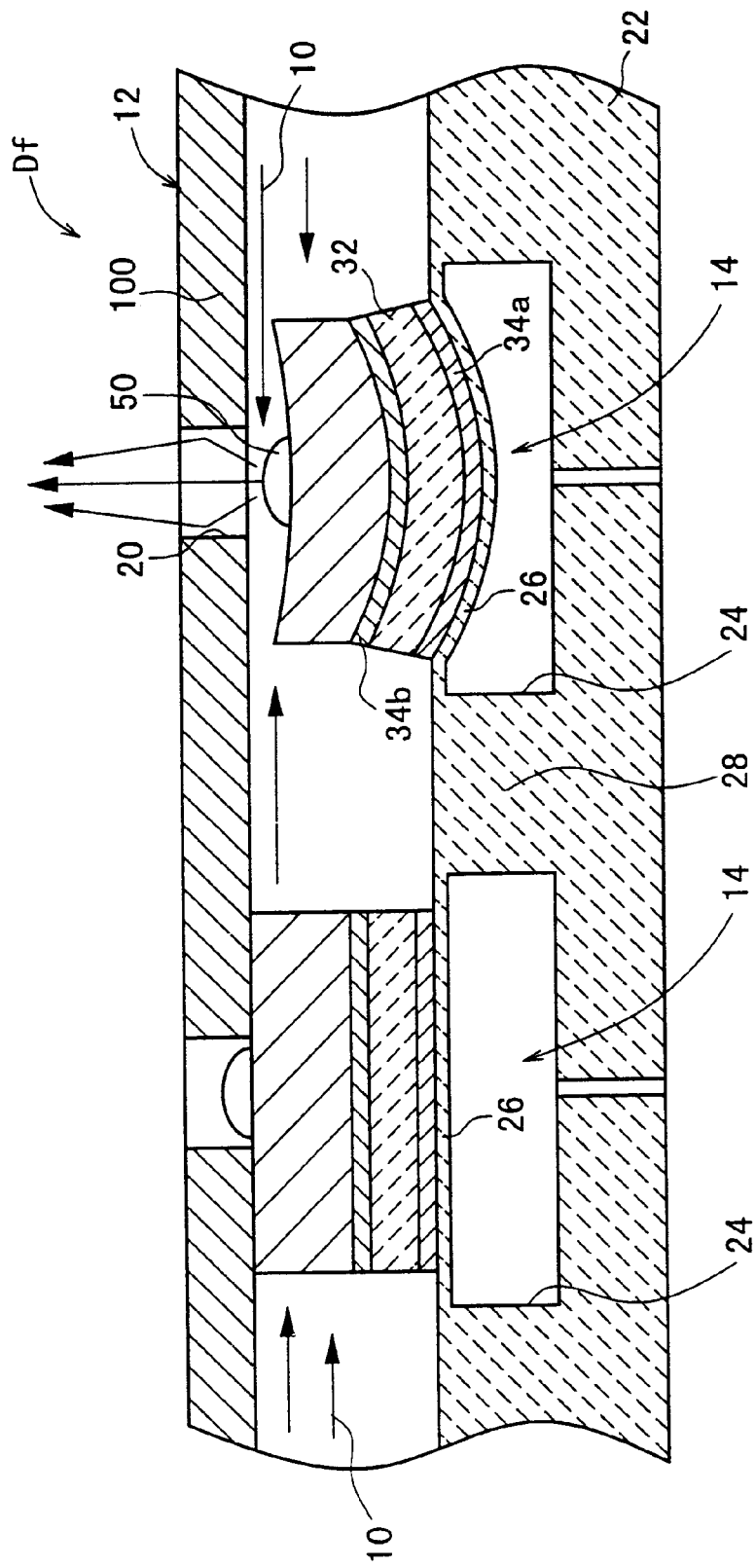
FIG. 21 shows an arrangement illustrating a display device according to a sixth embodiment.

As shown in FIG. 21, the display device Df according to the sixth embodiment is constructed in approximately the same manner as in the display device De according to the fifth embodiment (see FIG. 20). However, the former is different from the latter in that a light-emitting element 50 is formed on the upper surface of a displacement-transmitting section 18, and the actuator element 14 makes the displacement in the downward direction when the actuator element 14 is operated.

The displacement direction of the actuator element 14 is determined, for example, by the material characteristic of the shape-retaining layer 32 and the driving waveform. The predetermined displacement direction is obtained by approximately adjusting, for example, the selection of the material for the shape-retaining layer 32 and the driving waveform. For example, when a ferroelectric material is used for the shape-retaining layer 32 of the display device Df, the downward displacement is obtained by applying the magnetic field in the same direction as the direction of polarization.

When the actuator element 14 is in the natural state, the upper surface (light-shielding section) of the displacement-transmitting section 18 contacts with the second principal surface of the metal plate 100. Accordingly, the light 10, which is introduced into the space between the metal plate 100 and the actuator substrate 22, is intercepted. The light is not radiated through the light-transmitting section 20. When the actuator element 14 is operated to make the displacement in the downward direction, the upper surface (light-shielding section) of the displacement-transmitting section 18 is separated from the second principal surface of the metal plate 100. Accordingly, the light 10, which is introduced into the space between the metal plate 100 and the actuator substrate 22, is radiated onto the light-emitting element 50. The light behaves as the transmitted light, and it is radiated from the first principal surface of the metal plate 100 through the light-transmitting section 20.

Also in this embodiment, no light is radiated from any portion other than the light-transmitting section 20. The black level of the black background display on the screen obtained when the device is not in the operation state is approximately the same as that of the black background display obtained when the device is in the operation state. This feature contributes to the improvement in contrast, and it results in the improvement in image quality of the displayed image as well.

Next, display devices Dg and Dh according to the seventh and eighth embodiments will be explained with reference to FIGS. 22 and 23. Components or parts corresponding to those shown in FIG. 1 are designated by the same reference numerals, duplicate explanation of which will be omitted.

Figure 22:
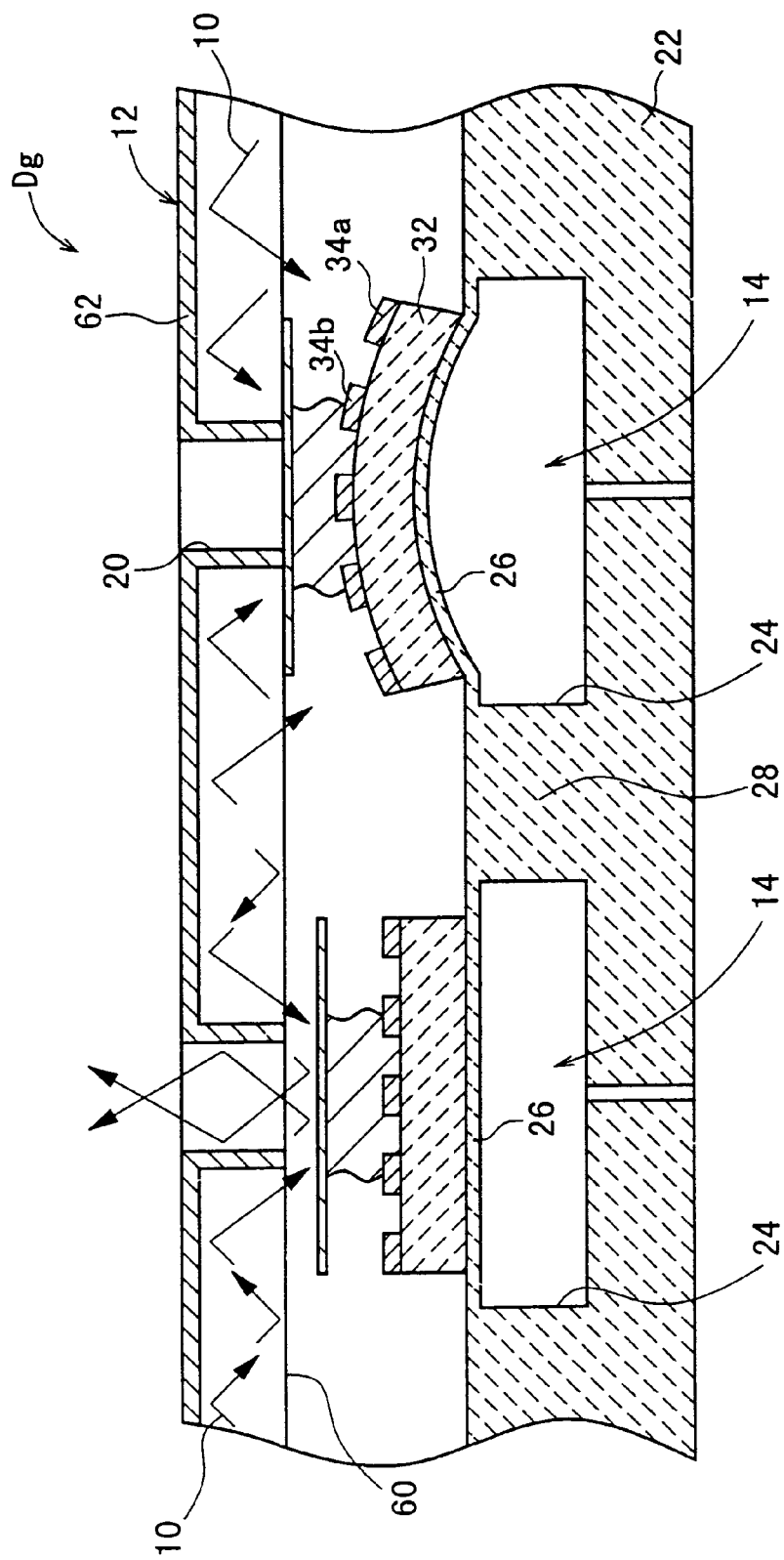
FIG. 22 shows an arrangement illustrating a display device according to a seventh embodiment.
Figure 23:
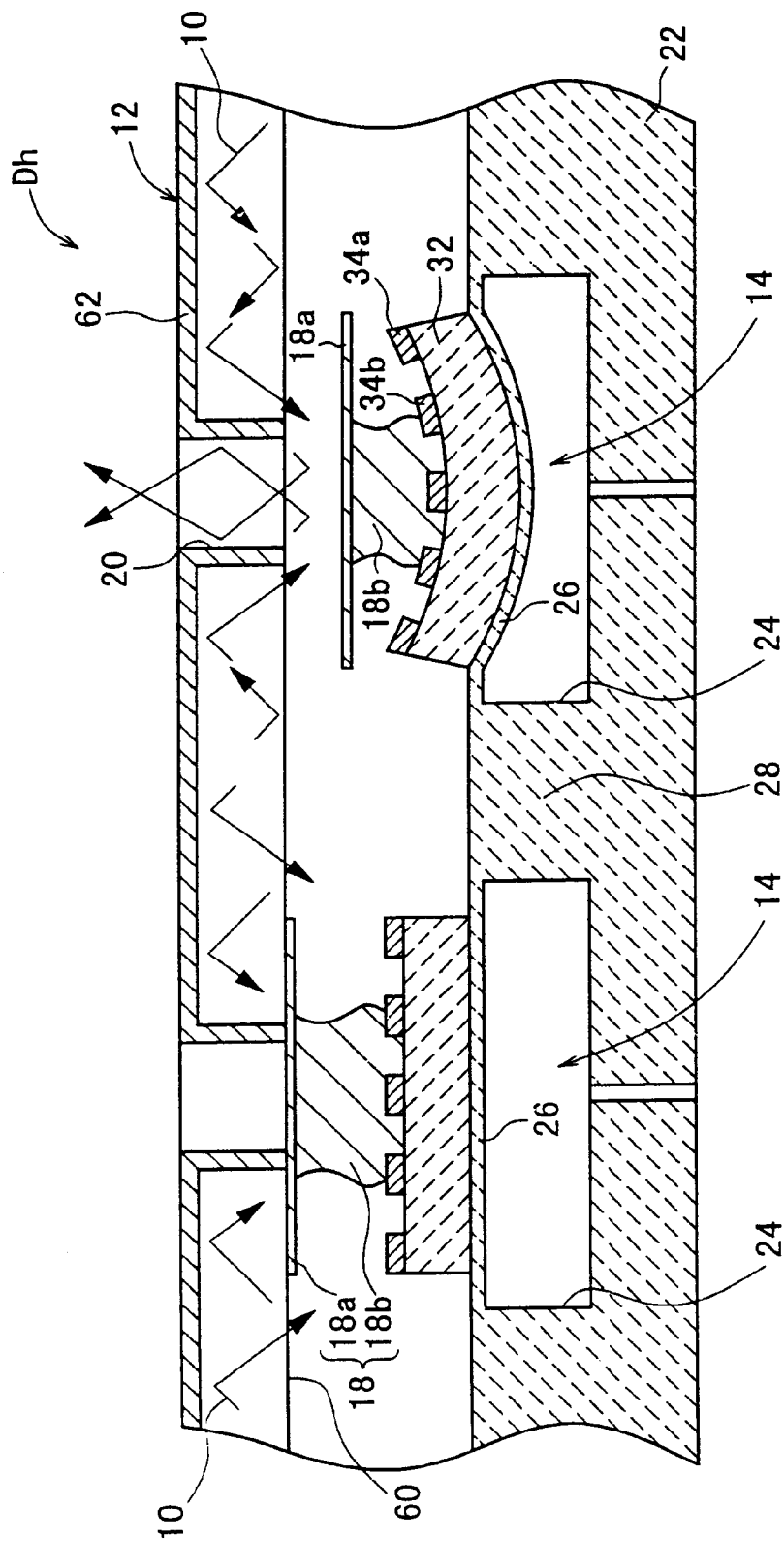
FIG. 23 shows an arrangement illustrating a display device according to an eighth embodiment.

As shown in FIGS. 22 and 23, the display devices Dg and Dh according to the seventh and eighth embodiments are constructed in approximately the same manner as in the display device Da according to the first embodiment (see FIG. 1) respectively. However, the formers are different from the latter in that a plate member 18a of the displacement-transmitting section 18 is made of a metal plate, and the plate member 18a functions not only as a light-emitting element 50 but also as a light-shielding section 52.

As shown in FIG. 22, the display device Dg according to the seventh embodiment is of the type in which the actuator element 14 makes the displacement in the upward direction when the actuator element 14 is operated. As shown in FIG. 23, the display device Dh according to the eighth embodiment is of the type in which the actuator element 14 makes the displacement in the downward direction when the actuator element 14 is operated.

The displacement direction of the actuator element 14 is determined, for example, by the material characteristic and the shape of the shape-retaining layer 32, the structure of the actuator substrate 22, the shape of the electrode, and the driving waveform. The predetermined displacement direction is obtained by appropriately adjusting these factors.

As shown in FIG. 22, as for the display device Dg according to the seventh embodiment, when the actuator element 14 is in the natural state, a state is given in which the plate member 18a of the displacement-transmitting section 18 is separated from the light-shielding plate 12. Accordingly, the light 10, which is leaked through the second principal surface of the light-shielding plate 12, is reflected by the plate member 18a. The light is radiated through the light-transmitting section 20. When the actuator element 14 is operated to make the displacement in the upward direction, the plate member 18a contacts with the second principal surface of the light-shielding plate 12. Accordingly, the light 10, which is leaked through the second principal surface of the light-shielding plate 12, is intercepted. Thus, the light is not radiated through the light-transmitting section 20.

On the other hand, as shown in FIG. 23, as for the display device Dh according to the eighth embodiment, when the actuator element 14 is in the natural state, the plate member 18a contacts with the second principal surface of the light-shielding plate 12. Accordingly, the light 10, which is leaked through the second principal surface of the light-shielding plate 12, is intercepted. Therefore, the light is not radiated through the light-transmitting section 20. When the actuator element 14 is operated to make the displacement in the downward direction, a state is given in which the plate member 18a is separated from the light-shielding plate 12. Accordingly, the light 10, which is leaked through the second principal surface of the light-shielding plate 12, is reflected by the plate member 18a. The light is radiated through the light-transmitting section 20.

Also in the display devices Dg and Dh according to the seventh and eighth embodiments, no light is radiated from any portion other than the light-transmitting section 20. Further, there is no leakage light at all toward the first principal surface, which would be otherwise caused by any defect or the like of the optical waveguide plate 60. It is possible to efficiently utilize the light 10 introduced into the optical waveguide plate 60. The black level of the black background display on the screen obtained when the device is not in the operation state is approximately the same as that of the black background display obtained when the device is in the operation state. This feature contributes to the improvement in contrast, and it results in the improvement in image quality of the displayed image as well.

The embodiments described above are illustrative of the case in which the metal plate is used for the plate member 18a. Alternatively, it is also preferable to use those including a light-reflective film such as a metal film formed on a plate material made of, for example, ceramics, glass, crystal matter, and plastic.

When the reflection is used to guide the light to the light-transmitting section 20, it is preferable that the surface of the plate member 18a is mirror-finished. When the light is guided by means of scattering, it is preferable that the surface of the plate member 18a is formed to be appropriately rough.

Further, it is more preferable that a light-reflective film such as a metal film is formed on the actuator substrate 22, in the same manner as in the display device De according to the fifth embodiment.

Next, a display device Di according to the ninth embodiment will be explained with reference to FIG. 24. Components or parts corresponding to those shown in FIG. 20 are designated by the same reference numerals, duplicate explanation of which will be omitted.

Figure 24:
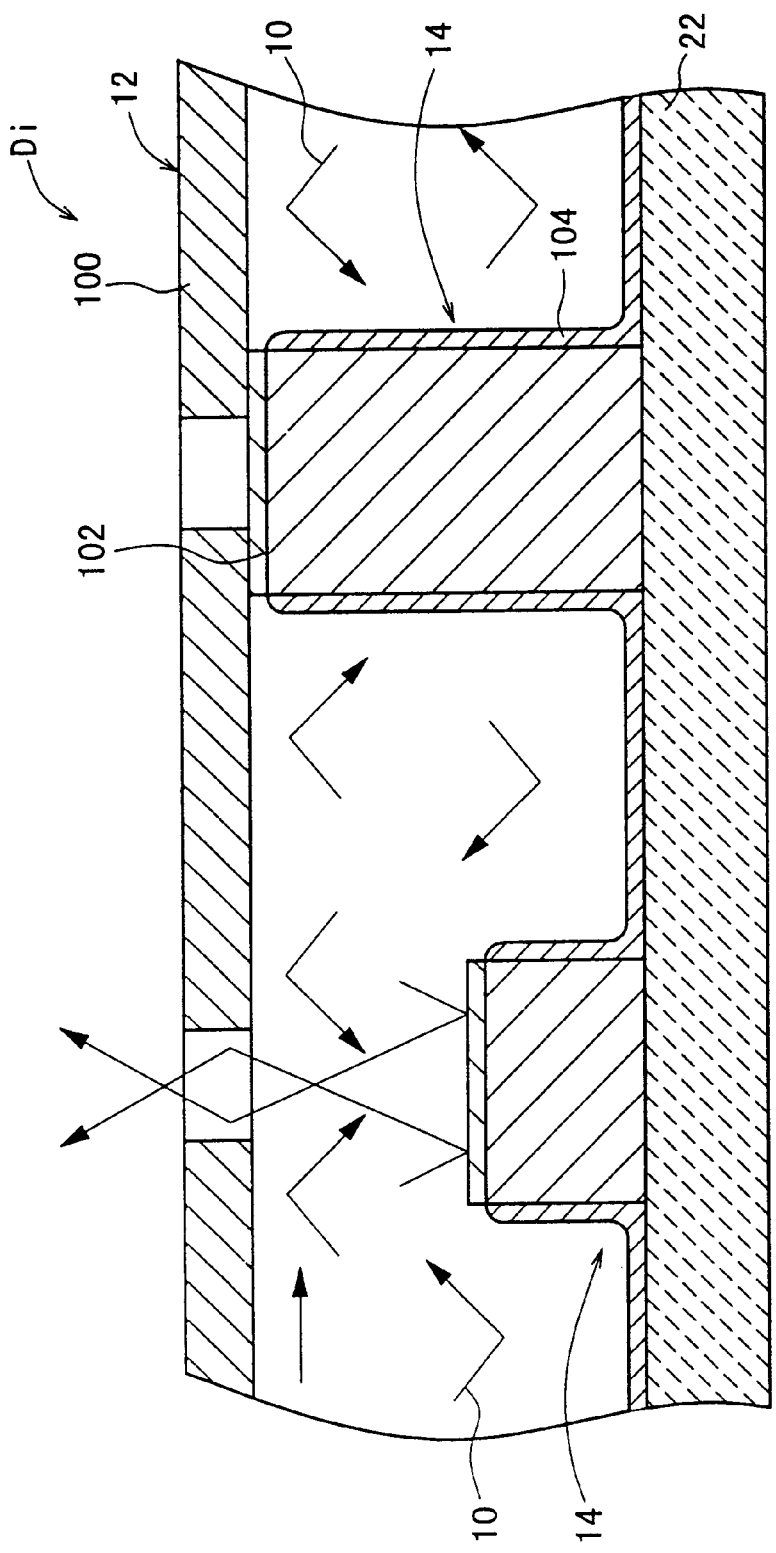
FIG. 24 shows an arrangement illustrating a display device according to a ninth embodiment.

As shown in FIG. 24, the display device Di according to the ninth embodiment is constructed in approximately the same manner as in the display device De according to the fifth embodiment (see FIG. 20). However, the former is different from the latter in that an actuator substrate 22 having a flat configuration is used, and an actuator element 14 of the stacked type as shown in FIG. 9 is used. The embodiment shown in the drawing is illustrative of the case in which a thin shield plate (metal plate) 102 is arranged on the actuator element 14 in order that the light 10 introduced into the space between the actuator substrate 22 and the metal plate 100 is guided to the light-transmitting section 20. Alternatively, it is also possible to use those having a metal film formed on, for example, ceramics, glass, plastic, or crystal matter.

Further, it is preferable that a light-reflective film 104 such as a metal film is formed on the actuator substrate 22 in order to facilitate the reflection of the introduced light 10. In this arrangement, it is necessary to effect insulation for the wiring and the electrode.

When the actuator element 14 is in the natural state, a state is given in which the light-shielding plate 102 is separated from the metal plate 100. Accordingly, the light 10, which is introduced into the space between the metal plate 100 and the actuator substrate 22, is reflected by the light-shielding plate 102. The light is radiated through the light-transmitting section 20. When the actuator element 14 is operated to make the displacement in the upward direction, the light-shielding plate 102 contacts with the second principal surface of the metal plate 100. Accordingly, the light 10, which is introduced into the space between the metal plate 100 and the actuator substrate 22, is intercepted. Therefore, the light is not radiated through the light-transmitting section 20.

Also in the ninth embodiment, no light is radiated from any portion other than the light-transmitting section 20. The black level of the black background display on the screen obtained when the device is not in the operation state is approximately the same as that of the black background display obtained when the device is in the operation state. This feature contributes to the improvement in contrast, and it results in the improvement in image quality of the displayed image as well.

Next, a display device DJ according to the tenth embodiment will be explained with reference to FIG. 25. Components or parts corresponding to those shown in FIG. 18 are designated by the same reference numerals, duplicate explanation of which will be omitted.

Figure 25:
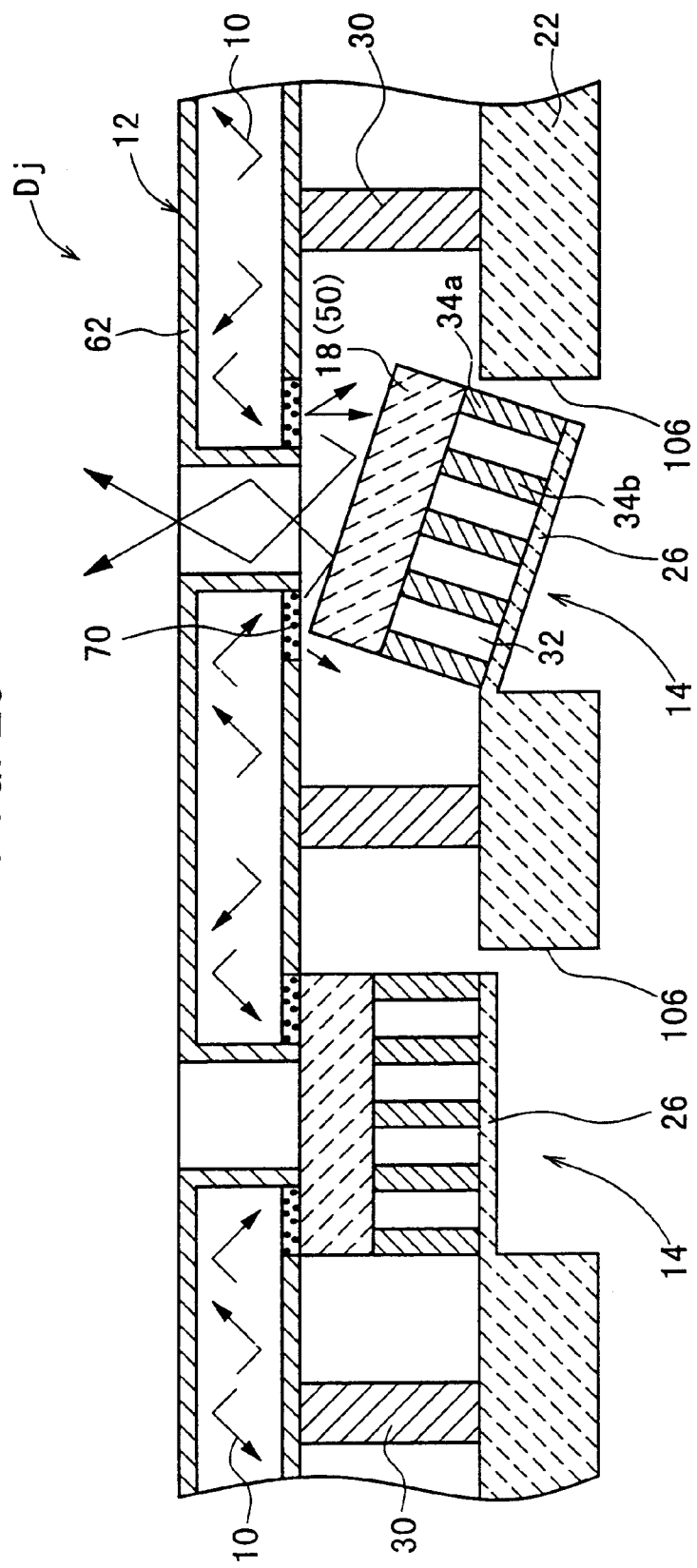
FIG. 25 shows an arrangement illustrating a display device according to a tenth embodiment.

As shown in FIG. 25, the display device Dj according to the tenth embodiment is constructed in approximately the same manner as in the display device Dc according to the third embodiment (see FIG. 18). However, the former is different from the latter in the following points. That is, an actuator substrate 22 used herein has a flat plate-shaped configuration with an opening 106 at a portion corresponding to the picture element. The actuator element 14 has the cantilever beam structure (see FIG. 13), and its electrode structure is the tiger skin structure, i.e., the structure in which the electrodes themselves are embedded in the shape-retaining layer 32 (see FIG. 11). The displacement-transmitting section 18 itself functions not only as the light-emitting element 50 but also as the light-shielding section 52. When the actuator element 14 is operated, the actuator element 14 makes the displacement in the downward direction.

When the actuator element 14 is in the natural state, the upper surface (light-shielding section 52) of the displacement-transmitting section 18 contacts with the mediating element 70 which is formed at the second principal surface of the light-shielding plate 12. Accordingly, the radiation of leakage light through the mediating element 70 disappears, and the radiation of light through the light-transmitting section 20 disappears. When the actuator element 14 is operated to make the displacement in the downward direction, the upper surface (light-shielding section 52) of the displacement-transmitting section 18 is separated from the second principal surface of the light-shielding plate 12. Accordingly, the leakage light, which passes through the mediating element 70, is reflected by the upper surface of the displacement-transmitting section 18. Thus, the light is radiated through the light-transmitting section 20.

Also in this embodiment, no light is radiated from any portion other than the light-transmitting section 20. Further, there is no leakage light at all toward the first principal surface, which would be otherwise caused by any defect or the like of the optical waveguide plate 60. It is possible to efficiently utilize the light 10 introduced into the optical waveguide plate 60. The black level of the black background display on the screen obtained when the device is not in the operation state is approximately the same as that of the black background display obtained when the device is in the operation state. This feature contributes to the improvement in contrast, and it results in the improvement in image quality of the displayed image as well.

Next, a display device Dk according to the eleventh embodiment will be explained with reference to FIG. 26. Components or parts corresponding to those shown in FIG. 25 are designated by the same reference numerals, duplicate explanation of which will be omitted.

Figure 26:
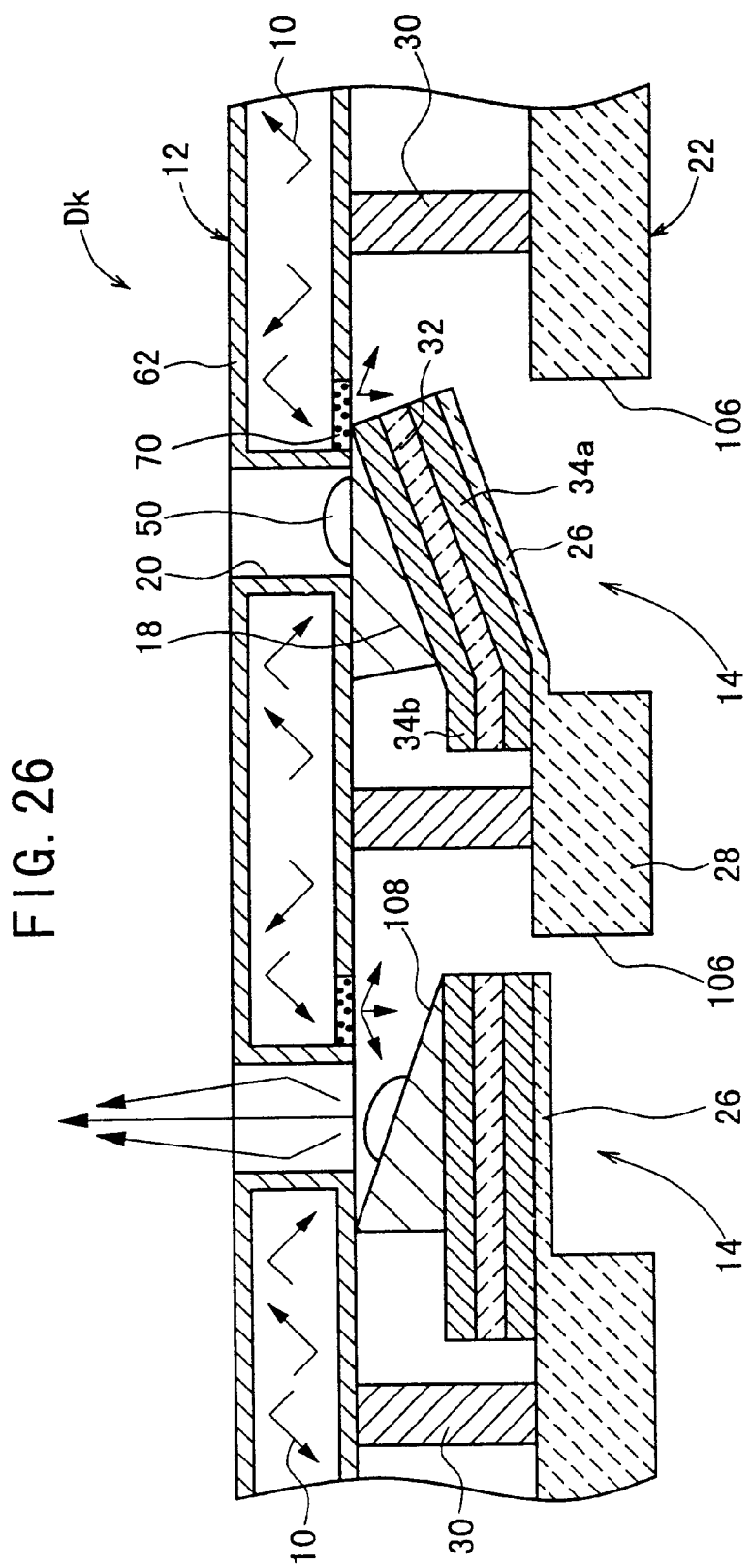
FIG. 26 shows an arrangement illustrating a display device according to an eleventh embodiment.

As shown in FIG. 26, the display device Dk according to the eleventh embodiment is constructed in approximately the same manner as in the display device Dj according to the tenth embodiment (see FIG. 25). However, the former is different from the latter in the following points. That is, the electrode structure of the actuator element 14 is of the sandwich structure. The shape-retaining layer 32 of the actuator element 14 is formed over an area ranging from the vibrating section 26 to a part of the fixed section 28. A light-emitting element 50 is formed on the displacement-transmitting section 18. When the actuator element 14 is operated, the actuator element 14 makes the displacement in the upward direction.

The displacement-transmitting section 18 on the actuator element 14 has a tapered surface 108 which is inclined downwardly in a certain direction (right direction in FIG. 26). When the actuator element 14 is in the natural state, the right side of the displacement-transmitting section 18 is in a state of being separated from the light-shielding plate 12 by a maximum distance. The upper surface of the displacement-transmitting section 18, i.e., the light-shielding section tightly contacts with the light-shielding plate 12 when the actuator element 14 makes the displacement in the upward direction.

Further, a mediating element 70 is formed at a portion of the second principal surface of the light-shielding plate 12, the portion providing the maximum spacing distance with respect to the displacement-transmitting section 18 when the actuator element 14 is in the natural state.

When the actuator element 14 is in the natural state, a state is given in which the upper surface (light-shielding section) of the displacement-transmitting section 18 is separated from the light-shielding plate 12. Accordingly, the light 10, which is leaked through the second principal surface of the light-shielding plate 12, is radiated onto the light-emitting element 50, and it behaves as the transmitted light. The light passes through the light-transmitting section 20, and it is radiated from the first principal surface of the light-shielding plate 12. When the actuator element 14 is operated to make the displacement in the upward direction, the upper surface (light-shielding section) of the displacement-transmitting section 18 contacts with the mediating element 70. Accordingly, the radiation of the leakage light through the mediating element 70 disappears. The radiation of light through the light-transmitting section 20 disappears.

Also in the display device Dk according to the eleventh embodiment, no light is radiated from any portion other than the light-transmitting section 20. Further, there is no leakage light at all toward the first principal surface, which would be otherwise caused by any defect or the like of the optical waveguide plate 60. It is possible to efficiently utilize the light 10 introduced into the optical waveguide plate 60. The black level of the black background display on the screen obtained when the device is not in the operation state is approximately the same as that of the black background display obtained when the device is in the operation state. This feature contributes to the improvement in contrast, and it results in the improvement in image quality of the displayed image as well.

Especially, the display device Dk is constructed such that the actuator element 14 is formed over the area ranging from the vibrating section 26 of the actuator substrate 22 to the fixed section 28. Therefore, the display device Dk is advantageous in that the rigidity is increased, and the response speed is accelerated, as compared with the display device Dj according to the tenth embodiment shown in FIG. 25 in which the actuator element 14 does not extend up to the fixed section 28.

Next, a display device Dm according to the twelfth embodiment will be explained with reference to FIG. 27. Components or parts corresponding to those shown in FIG. 22 are designated by the same reference numerals, duplicate explanation of which will be omitted.

Figure 27:
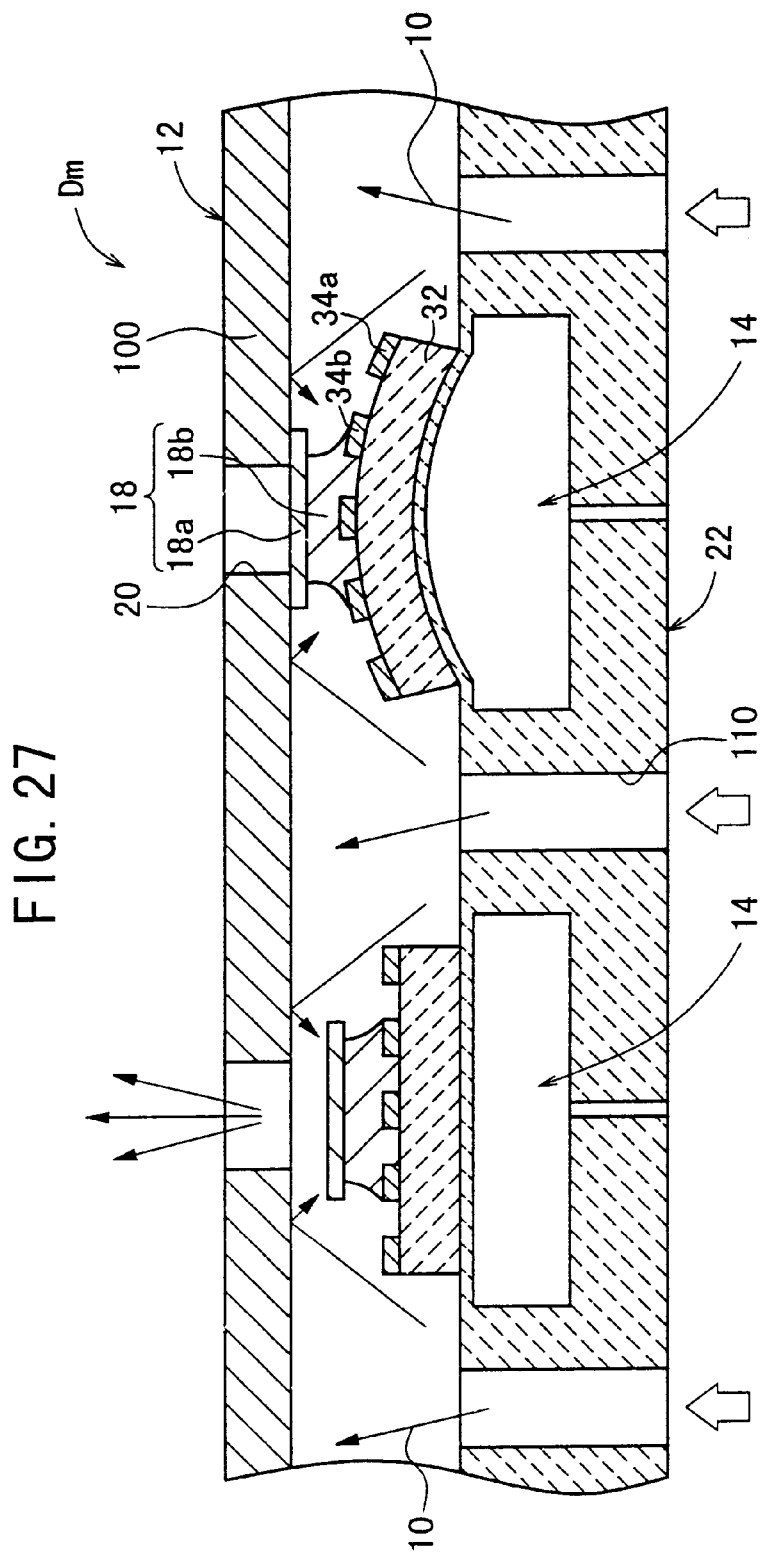
FIG. 27 shows an arrangement illustrating a display device according to a twelfth embodiment.

As shown in FIG. 27, the display device Dm according to the twelfth embodiment is constructed in approximately the same manner as in the display device Dg according to the seventh embodiment (see FIG. 22). However, the former is different from the latter in that the light-shielding plate 12 is constructed by a metal plate 100, a large number of openings 110 are formed through the actuator substrate 22, and the light 10 is introduced through the openings 110.

As for the light source, a variety of light sources may be used to radiate the light 10 from the back surface of the actuator substrate 22. Alternatively, for example, an optical fiber may be used to introduce the light 10 from each of the openings 110.

When the actuator element 14 is in the natural state, a state is given in which the plate member 18a is separated from the metal plate 100. Accordingly, the light 10, which is introduced through the openings 110 from the back surface of the actuator substrate 22, is reflected by the plate member 18a. The light is radiated through the light-transmitting section 20. When the actuator element 14 is operated to make the displacement in the upward direction, the plate member 18a contacts with the second principal surface of the metal plate 100. Accordingly, the light 10, which is introduced through the openings 110 from the back surface of the actuator substrate 22, is intercepted. The light is not radiated through the light-transmitting section 20.

Also in this embodiment, no light is radiated from any portion other than the light-transmitting section 20. The black level of the black background display on the screen obtained when the device is not in the operation state is approximately the same as that of the black background display obtained when the device is in the operation state. This feature contributes to the improvement in contrast, and it results in the improvement in image quality of the displayed image as well.

Next, a display device Dn according to the thirteenth embodiment will be explained with reference to FIG. 28. Components or parts corresponding to those shown in FIG. 26 are designated by the same reference numerals, duplicate explanation of which will be omitted.

Figure 28:
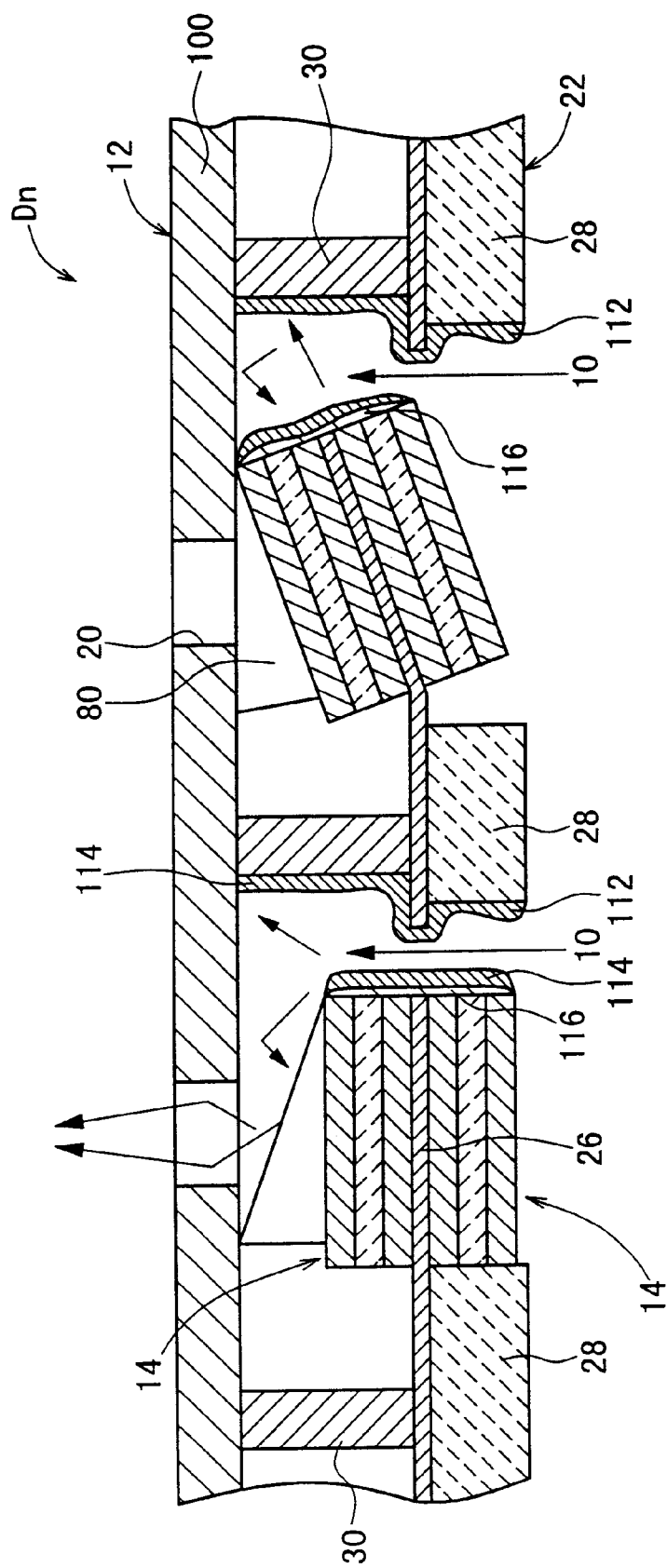
FIG. 28 shows an arrangement illustrating a display device according to a thirteenth embodiment.

As shown in FIG. 28, the display device Dn according to the thirteenth embodiment is constructed in approximately the same manner as in the display device Dk according to the eleventh embodiment. However, the former is different from the latter in the following points. That is, the light-shielding plate 12 is made of a metal plate 100. The display device Dn has the bimorph type structure in which the actuator elements 14 are provided on the upper and lower surfaces of the vibrating section 26 respectively. Openings 112 for introducing the light 10 are provided between the free end of the vibrating section 26 and the fixed section 28. The displacement-transmitting section 18 itself functions not only as the light-emitting element 50 but also as the light-shielding section.

In order that the light 10 introduced from the back surface of the actuator substrate 22 is efficiently transmitted toward the light-transmitting section 20, the display device Dn comprises a light-reflective film 114 which is formed at the portion to serve as an optical path for the light 10, i.e., at the free end of the vibrating section 26, the respective free ends of the upper and lower actuator elements 14, and the portion continuously ranging from the crosspiece 30, the fixed section 28, and the opening 112. Especially, an insulative film 116 is formed between the respective actuator elements 14 and the light-reflective film 114.

When the actuator element 14 is in the natural state, a state is given in which the upper surface (light-shielding section) of the displacement-transmitting section 18 is separated from the metal plate 100. Accordingly, the light 10, which is introduced through the openings 112 from the back surface of the actuator substrate 22, is reflected by the upper surface of the displacement-transmitting section 18. The light is radiated through the light-transmitting section 20. When the actuator element 14 is operated to make the displacement in the upward direction, the upper surface (light-shielding section) of the displacement-transmitting section 18 contacts with the second principal surface of the metal plate 100. Accordingly, the light 10, which is introduced through the openings 112 from the back surface of the actuator substrate 22, is intercepted. Therefore, the light is not radiated through the light-transmitting section 20.

Also in the display device Dn, no light is radiated from any portion other than the light-transmitting section 20. The black level of the black background display on the screen obtained when the device is not in the operation state is approximately the same as that of the black background display obtained when the device is in the operation state. This feature contributes to the improvement in contrast, and it results in the improvement in image quality of the displayed image as well.

Next, a display device Dp according to the fourteenth embodiment will be explained with reference to FIG. 29. Components or parts corresponding to those shown in FIG. 27 are designated by the same reference numerals, duplicate explanation of which will be omitted.

Figure 29:
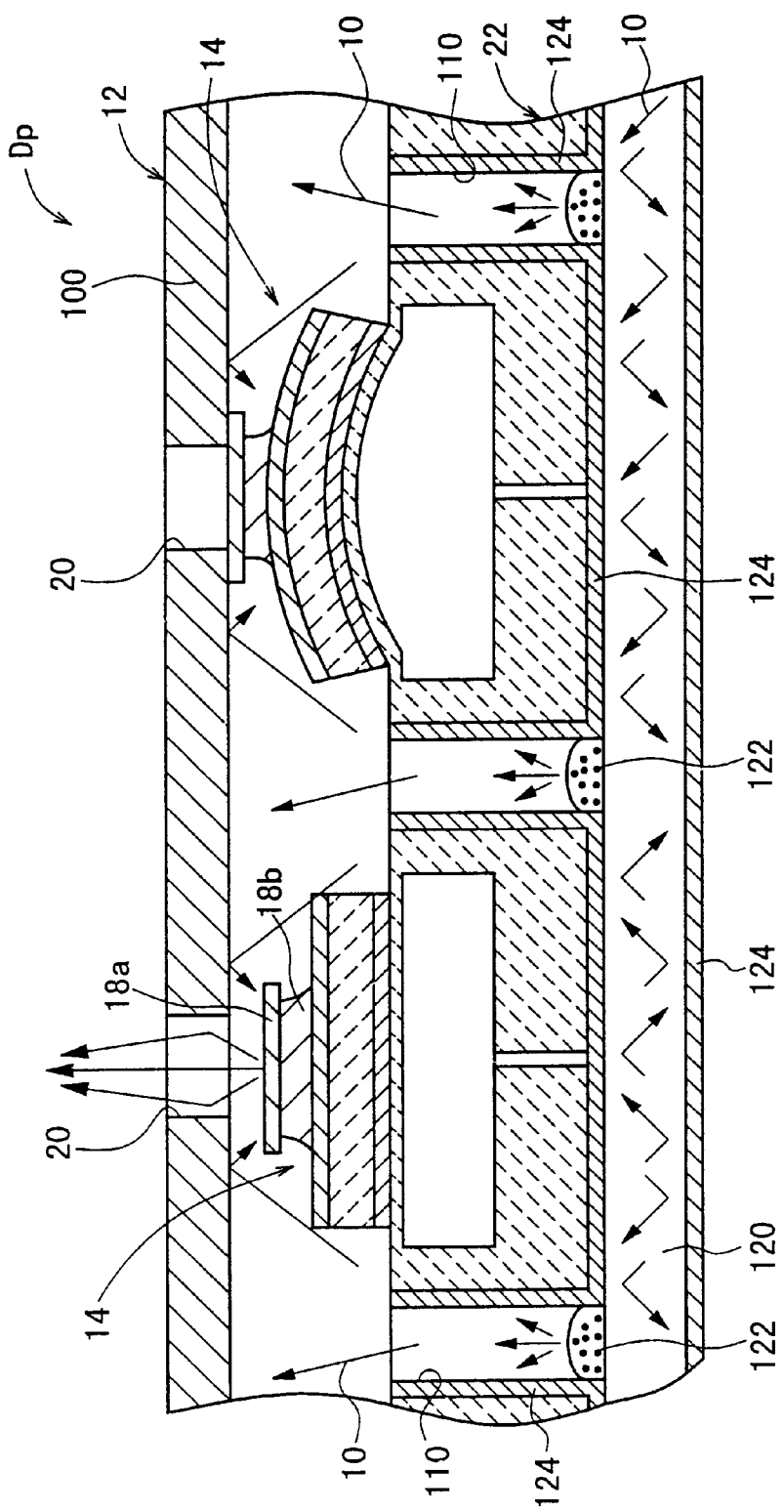
FIG. 29 shows an arrangement illustrating a display device according to a fourteenth embodiment.

As shown in FIG. 29, the display device Dp according to the fourteenth embodiment is constructed in approximately the same manner as in the display device Dm according to the twelfth embodiment (see FIG. 27). However, the former is different from the latter in that the electrode structure of the actuator element 14 is the sandwich structure, and an optical waveguide plate 120 is arranged at the back of the actuator substrate 22.

A mediating element 122 (a light-emitting element or a light-scattering element) is formed at a portion of the first principal surface of the optical waveguide plate 120 corresponding to an opening 110 of the actuator substrate 22. A light-reflective film 124 (metal film) is formed on the other portions of the surface. The light-reflective film 124 (metal film) is also formed on the second principal surface of the optical waveguide plate 120. The light-reflective film 124 is also formed on the inner wall surface of the opening 110.

In this embodiment, the light 10 is introduced from the lateral end of the optical waveguide plate 120. The light 10, which is introduced into the optical waveguide plate 120, is totally reflected by the light-reflective film 124 formed on the first principal surface and the second principal surface of the optical waveguide plate 120. A part of the totally reflected light 10 passes through the mediating element 122 which is formed at the first principal surface of the optical waveguide plate 120. The light behaves as the leakage light, and it is radiated from the first principal surface of the optical waveguide plate 120. Thus, the light is introduced into a space between the metal plate 100 and the actuator substrate 22.

When the actuator element 14 is in the natural state, a state is given in which the plate member 18a is separated from the metal plate 100. Accordingly, the light 10, which is introduced from the optical waveguide plate 120 into the space between the metal plate 100 and the actuator substrate 22, is reflected by the plate member 18a. The light is radiated through the light-transmitting section 20. When the actuator element 14 is operated to make the displacement in the upward direction, the plate member 18a contacts with the second principal surface of the metal plate 100. Accordingly, the light 10, which is introduced from the optical waveguide plate 120 into the space between the metal plate 100 and the actuator substrate 22, is intercepted. Thus, the light is not radiated through the light-transmitting section 20.

Also in this embodiment, no light is radiated from any portion other than the light-transmitting section 20. The black level of the black background display on the screen obtained when the device is not in the operation state is approximately the same as that of the black background display obtained when the device is in the operation state. This feature contributes to the improvement in contrast, and it results in the improvement in image quality of the displayed image as well.

Next, a display device Dq according to the fifteenth embodiment will be explained with reference to FIG. 30. Components or parts corresponding to those shown in FIG. 19 are designated by the same reference numerals, duplicate explanation of which will be omitted.

Figure 30:
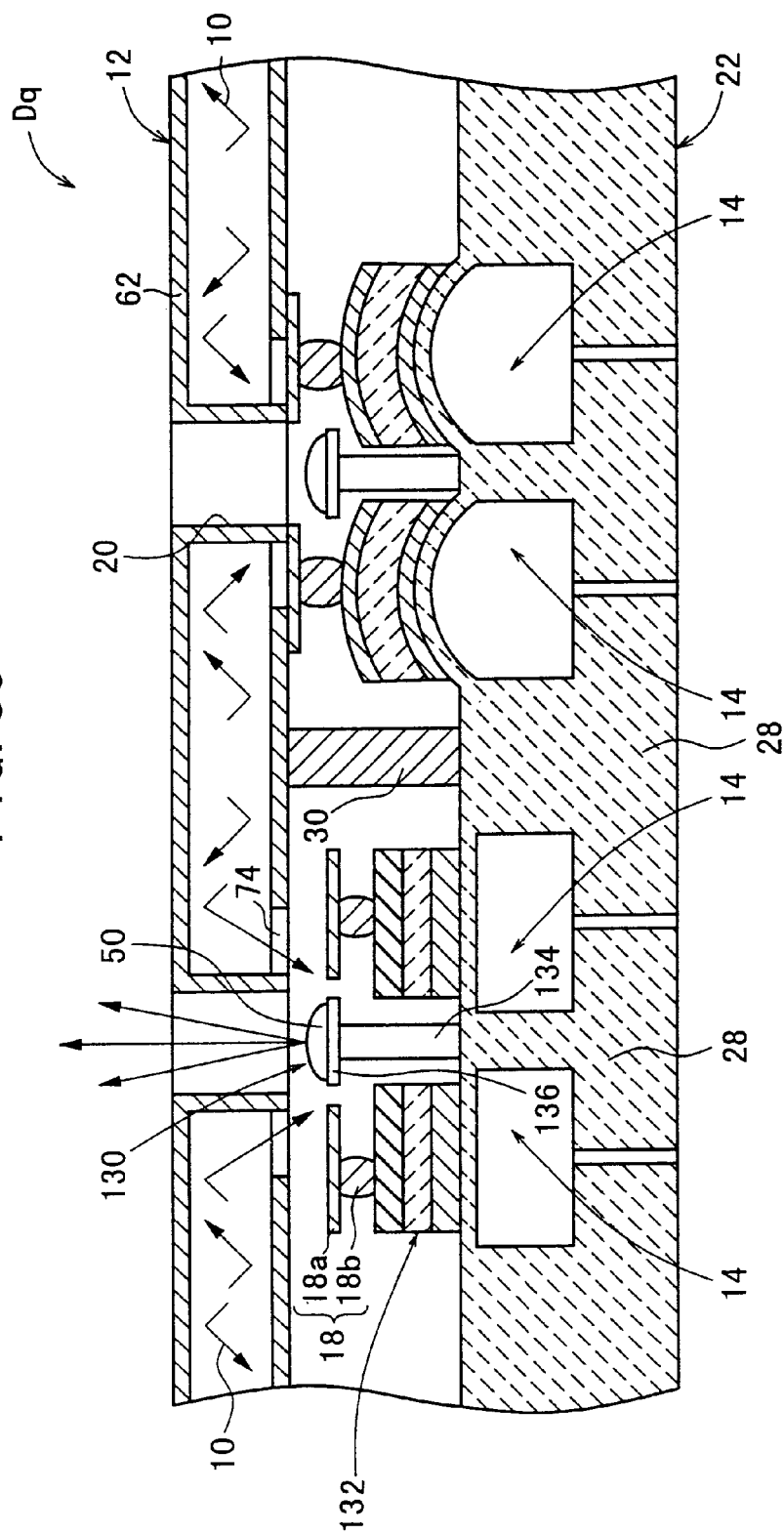
FIG. 30 shows an arrangement illustrating a display device according to a fifteenth embodiment.

As shown in FIG. 30, the display device Dq according to the fifteenth embodiment is constructed in approximately the same manner as in the display device Dd according to the fourth embodiment. However, the former is different from the latter in that a light-emitting section 130 for radiating the light to the light-transmitting section 20 is formed separately from a shutter section 132 for selectively intercepting the radiation of light through the light-transmitting section 20.

Specifically, the light-emitting section 130 comprises a support pillar 134 installed opposingly to the light-transmitting section 20 of the light-shielding plate 12, a setting stand 136 formed on the support pillar 134, and a light-emitting element 50 formed on the setting stand 136. The support pillar 134 functions as a member for defining the distance between the light-emitting element 50 and the light-transmitting section 20.

The shutter section 132 comprises two actuator elements 14 provided on both sides of the light-emitting element 50, and displacement-transmitting sections 18 formed on the respective actuator elements 14. In this embodiment, the components are arranged such that the plate member 18a of the displacement-transmitting section 18 is mutually opposed to an exposed section 74 of the optical waveguide plate 60 formed at the second principal surface of the light-shielding plate 12.

Of course, the shutter section 132 may be constructed as including a ring-shaped actuator element 14 formed to surround the light-emitting section 130, and a ring-shaped displacement-transmitting section 18 formed on the actuator element 14.

The portions of the actuator substrate 22, which correspond to the light-emitting sections 130 respectively, are used as fixed sections 28, giving a structure in which the light-emitting section 130 is not displaced in the upward direction even when the actuator element 14 is displaced in the upward direction.

When the actuator element 14 is in the natural state, a state is given in which the plate member 18a of the displacement-transmitting section 18 is separated from the light-shielding plate 12. Accordingly, the light 10, which is leaked through the second principal surface of the light-shielding plate 12, is radiated onto the light-emitting element 50 of the light-emitting section 130. The light behaves as the transmitted light, and it is radiated from the first principal surface of the light-shielding plate 12. When the actuator element 14 is operated to make the displacement in the upward direction, the plate member 18*a* of the displacement-transmitting section 18 contacts with the light-shielding plate 12. Accordingly, the radiation of leakage light through the exposed section 74 disappears. Thus, the radiation of light through the light-transmitting section 20 disappears.

Also in the display device Dq, no light is radiated from any portion other than the light-transmitting section 20. Further, there is no leakage light at all toward the first principal surface, which would be otherwise caused by any defect or the like of the optical waveguide plate 60. It is possible to efficiently utilize the light 10 introduced into the optical waveguide plate 60. The black level of the black background display on the screen obtained when the device is not in the operation state is approximately the same as that of the black background display obtained when the device is in the operation state. This feature contributes to the improvement in contrast, and it results in the improvement in image quality of the displayed image as well.

Especially, in the display device Dq, the assembly of the light-emitting section 130 and the assembly of the shutter section 132 can be designed individually. Therefore, the display device Dq is advantageous in that the light-emitting section 130 can be independently arranged so that the light emission is advantageously effected, and the shutter section 132 can be independently arranged so that the light interception is advantageously effected.

Next, a display device Dr according to the sixteenth embodiment will be explained with reference to FIG. 31. Components or parts corresponding to those shown in FIG. 30 are designated by the same reference numerals, duplicate explanation of which will be omitted.

Figure 31:
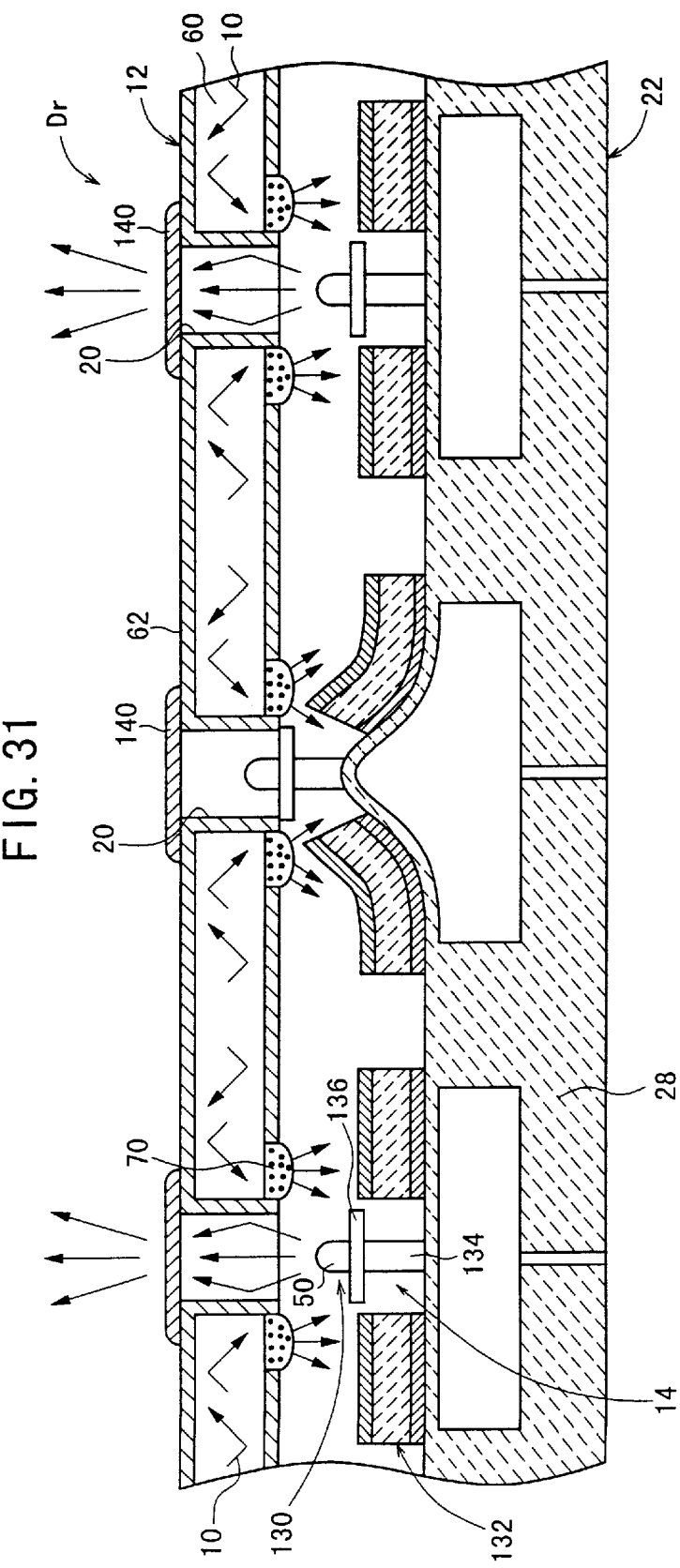
FIG. 31 shows an arrangement illustrating a display device according to a sixteenth embodiment.

As shown in FIG. 31, the display device Dr according to the sixteenth embodiment is constructed in approximately the same manner as in the display device Dq according to the fifteenth embodiment (see FIG. 30). However, the former is different from the latter the following points. That is, a mediating element 70 is formed at a portion of the second principal surface of the light-shielding plate 12 in the vicinity of the light-transmitting section 20. A color filter 140 is formed at a portion of the first principal surface of the light-shielding plate 12 corresponding to the light-transmitting section 20. A portion of the actuator substrate 22 corresponding to a light-emitting section 130 is not used as the fixed section 28 (the light-emitting section 130 is formed directly on the vibrating section 26). The displacement-transmitting section 18 is not formed on the actuator element 14.

That is, the structure of the actuator element 14 is of the type as composed of actuators having a cantilever beam structure in combination. In this embodiment, when the actuator element 14 is displaced in the upward direction, the light-emitting section 130 is simultaneously displaced in the upward direction. The planar size of the setting stand 136 is designed to be approximately the same as the aperture width of the light-transmitting section 20.

When the actuator element 14 is in the natural state, a state is given in which the setting stand 136 of the light-emitting section 130 is separated from the light-shielding plate 12. Accordingly, the light, which is leaked through the second principal surface of the light-shielding plate 12, is radiated onto the light-emitting element 50. The light behaves as the transmitted light, and it is radiated through the light-transmitting section 20 from the first principal surface of the light-shielding plate 12. When the actuator element 14 is operated to make the displacement in the upward direction, a situation is given in which the setting stand 136 of the light-emitting section 130 closes the light-transmitting section 20 of the light-shielding plate 12. Accordingly, the light 10, which is leaked through the second principal surface of the light-shielding plate 12, is intercepted. Thus, the light is not radiated through the light-transmitting section 20.

Also in the display device Dr, no light is radiated from any portion other than the light-transmitting section 20. Further, there is no leakage light at all toward the first principal surface, which would be otherwise caused by any defect or the like of the optical waveguide plate 60. It is possible to efficiently utilize the light 10 introduced into the optical waveguide plate 60. The black level of the black background display on the screen obtained when the device is not in the operation state is approximately the same as that of the black background display obtained when the device is in the operation state. This feature contributes to the improvement in contrast, and it results in the improvement in image quality of the displayed image as well.

Next, a display device Ds according to the seventeenth embodiment will be explained with reference to FIG. 32. Components or parts corresponding to those shown in FIG. 22 are designated by the same reference numerals, duplicate explanation of which will be omitted.

Figure 32:
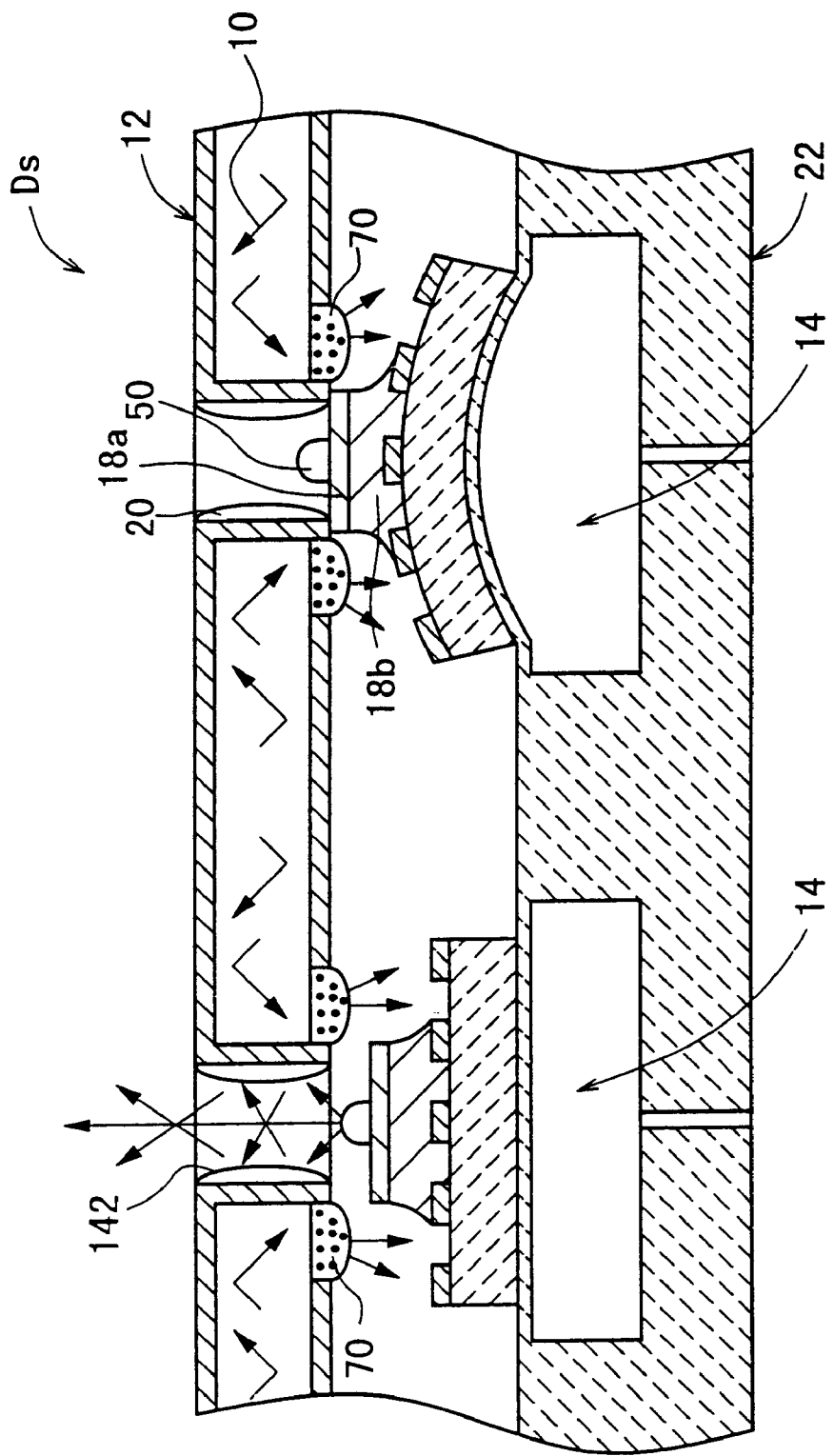
FIG. 32 shows an arrangement illustrating a display device according to a seventeenth embodiment.

As shown in FIG. 32, the display device Ds according to the seventeenth embodiment is constructed in approximately the same manner as in the display device Dc according to the third embodiment. However, the former is different from the latter in that the planar size of the plate member 18*a* of the displacement-transmitting section 18 is designed to be approximately the same as the aperture width of the light-transmitting section 20, and a light-emitting element 142 is also formed on the inner wall surface of each of the light-transmitting sections 20.

When the actuator element 14 is in the natural state, a state is given in which the plate member 18*a* of the displacement-transmitting section 18 is separated from the light-shielding plate 12. Accordingly, the light 10, which is leaked through the mediating element 70, is radiated onto the light-emitting element 50. The light is radiated as the transmitted light as it is from the first principal surface of the light-shielding plate 12. A part of the transmitted light is radiated onto the light-emitting element 142 which is formed on the inner wall surface of the light-transmitting section 20, and then it is radiated from the first principal surface of the light-shielding plate 12. When the actuator element 14 is operated to make the displacement in the upward direction, a situation is given in which the plate member 18*a* closes the light-transmitting section 20. Accordingly, the light 10, which is leaked through the mediating element 70, is intercepted. Thus, the light is not radiated through the light-transmitting section 20.

Also in the display device Ds, no light is radiated from any portion other than the light-transmitting section 20. Further, there is no leakage light at all toward the first principal surface, which would be otherwise caused by any defect or the like of the optical waveguide plate 60. It is possible to efficiently utilize the light 10 introduced into the optical waveguide plate 60. The black level of the black background display on the screen obtained when the device is not in the operation state is approximately the same as that of the black background display obtained when the device is in the operation state. This feature contributes to the improvement in contrast, and it results in the improvement in image quality of the displayed image as well.

The display device Ds according to the seventeenth embodiment is illustrative of the case in which the light-emitting element 142 is formed on the inner wall surface of the light-transmitting section 20 of the light-shielding plate 12. However, this arrangement is also applicable to the display devices Da to Dr according to the first to sixteenth embodiments described above and to display devices Dt to Dx according to the eighteenth to twenty-second embodiments described later on.

Next, a display device Dt according to the eighteenth embodiment will be explained with reference to FIG. 33. Components or parts corresponding to those shown in FIG. 1 are designated by the same reference numerals, duplicate explanation of which will be omitted.

Figure 33:
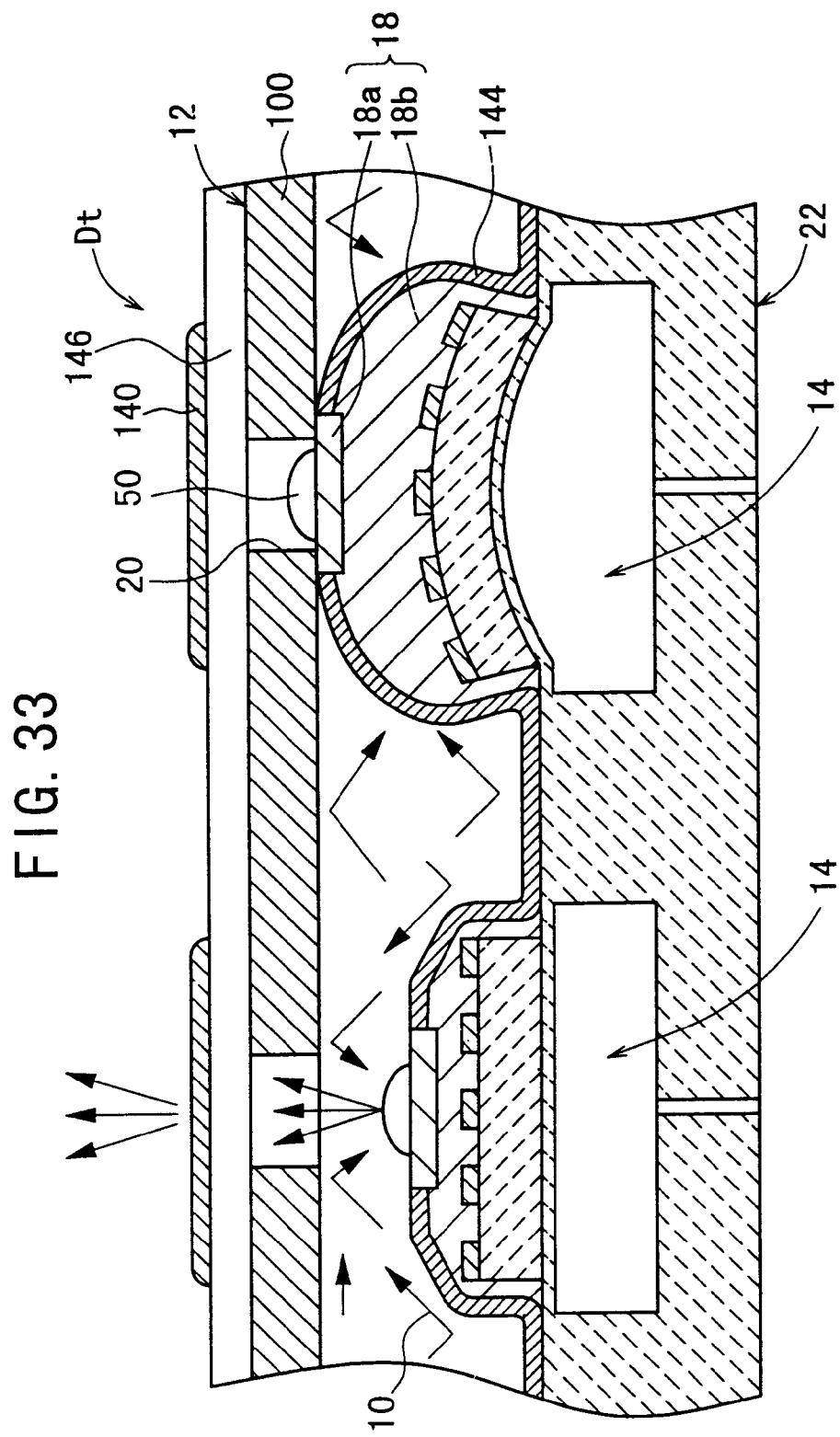
FIG. 33 shows an arrangement illustrating a display device according to an eighteenth embodiment.

As shown in FIG. 33, the display device Dt according to the eighteenth embodiment is constructed in approximately the same manner as in the display device Da according to the first embodiment. However, the former is different from the latter in the following points. That is, the light-shielding plate 12 is constructed by a metal plate 100. The displacement-transmitting member 18b of the displacement-transmitting section 18 is composed of an insulator which is formed to cover the actuator element 14. A light-reflective film 144 is formed on the entire surface of the actuator substrate 22 except for the plate member 18a. A transparent plate 146 (made of those which transmit light, such as glass, plastic, and crystal matter) is stacked on the side of the first principal surface of the metal plate 100. A color filter 140 is formed on a portion of the first principal surface of the transparent plate 146 corresponding to the light-transmitting section 20. The light 10 is introduced from the light source into a space between the metal plate 100 and the actuator substrate 22.

When the actuator element 14 is in the natural state, a state is given in which the plate member 18a of the displacement-transmitting section 18 is separated from the metal plate 100. Accordingly, the light 10, which is introduced into the space between the metal plate 100 and the actuator substrate 22, is radiated onto the light-emitting element 50. The light behaves as the transmitted light which passes through the light-transmitting section 20, and it is radiated from the first principal surface of the metal plate 100. When the actuator element 14 is operated to make the displacement in the upward direction, the plate member 18a contacts with the second principal surface of the metal plate 100. Accordingly, the light 10, which is introduced into the space between the metal plate 100 and the actuator substrate 22, is intercepted. Thus, the light is not radiated through the light-transmitting section 20.

Also in the display device Dt, no light is radiated from any portion other than the light-transmitting section 20. The black level of the black background display on the screen obtained when the device is not in the operation state is approximately the same as that of the black background display obtained when the device is in the operation state. This feature contributes to the improvement in contrast, and it results in the improvement in image quality of the displayed image as well.

Next, a display device Du according to the nineteenth embodiment will be explained with reference to FIG. 34. Components or parts corresponding to those shown in FIG. 33 are designated by the same reference numerals, duplicate explanation of which will be omitted.

Figure 34:
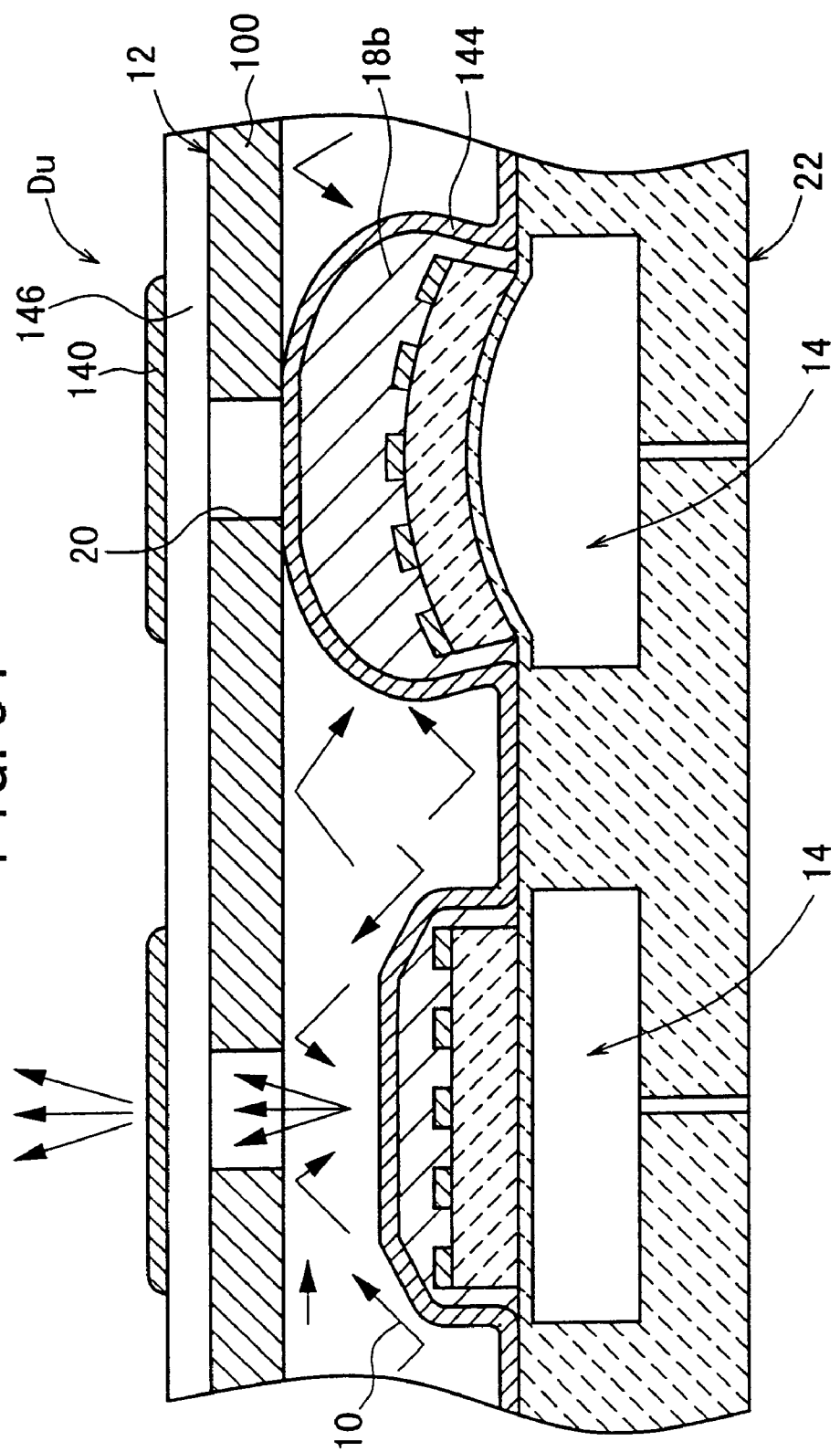
FIG. 34 shows an arrangement illustrating a display device according to a nineteenth embodiment.

As shown in FIG. 34, the display device Du according to the nineteenth embodiment is constructed in approximately the same manner as in the display device Dt according to the eighteenth embodiment (see FIG. 33). However, the former is different from the latter in that a light-reflective film 144 is formed on the entire surface of the actuator substrate 22, and neither the plate member 18a nor the light-emitting element 50 exists. That is, the light-reflective film 144 itself functions not only as the light-emitting section 130 but also as the shutter section 132 for selectively shielding the light-transmitting section 20 of the metal plate 100.

When the actuator element 14 is in the natural state, a state is given in which the light-reflective film 144 is separated from the metal plate 100. Accordingly, the light 10, which is introduced into the space between the metal plate 100 and the actuator substrate 22, is reflected by the light-reflective film 144. The light passes through the light-transmitting section 20, and it is radiated therefrom. When the actuator element 14 is operated to make the displacement in the upward direction, the light-reflective film 144 contacts with the second principal surface of the metal plate 100. Accordingly, the light 10, which is introduced into the space between the metal plate 100 and the actuator substrate 22, is intercepted. Thus, the light is not radiated through the light-transmitting section 20.

Also in the display device Du, no light is radiated from any portion other than the light-transmitting section 20. The black level of the black background display on the screen obtained when the device is not in the operation state is approximately the same as that of the black background display obtained when the device is in the operation state. This feature contributes to the improvement in contrast, and it results in the improvement in image quality of the displayed image as well.

Next, a display device Dv according to the twentieth embodiment will be explained with reference to FIG. 35. Components or parts corresponding to those shown in FIG. 30 are designated by the same reference numerals, duplicate explanation of which will be omitted.

Figure 35:
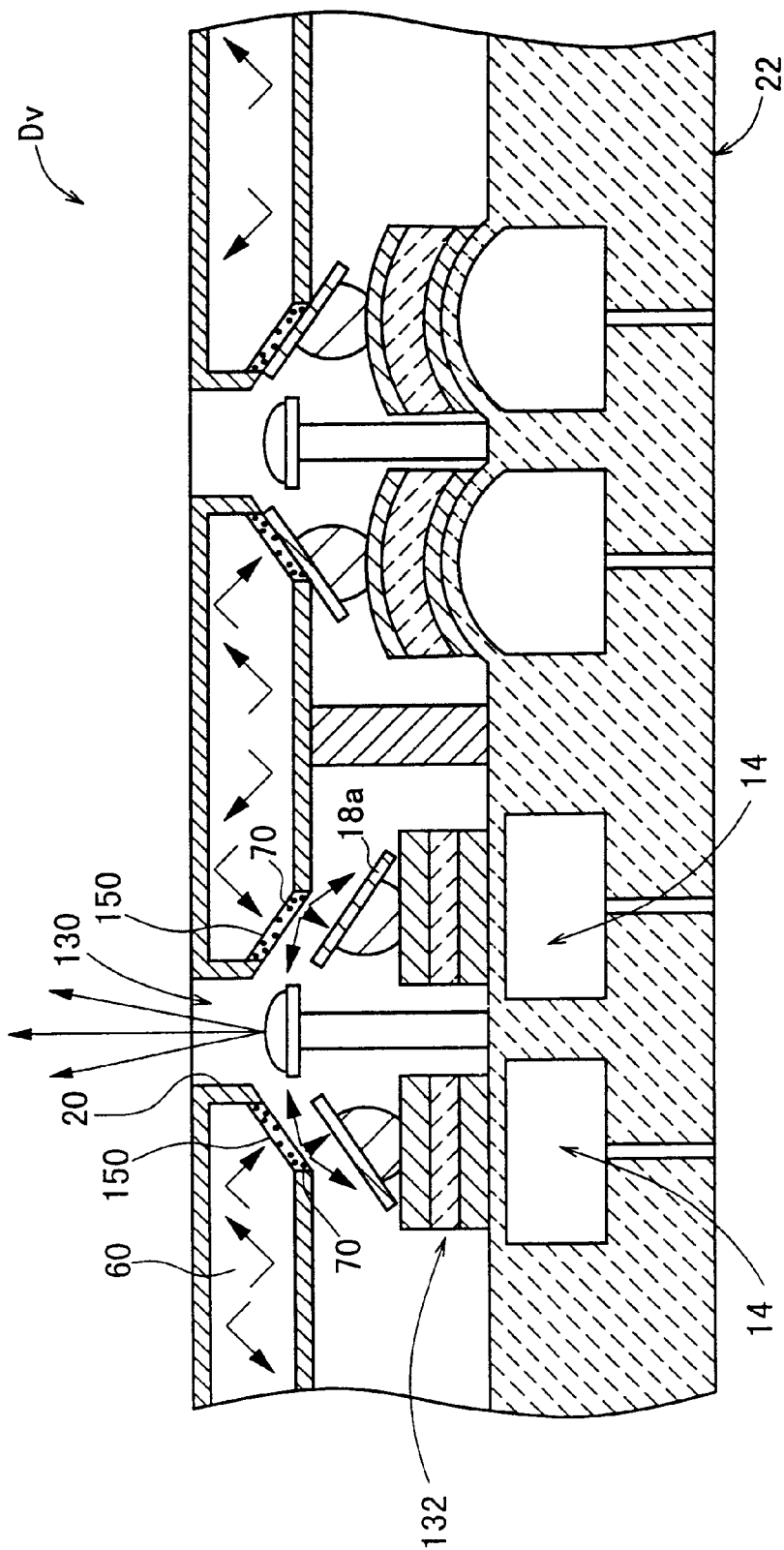
FIG. 35 shows an arrangement illustrating a display device according to a twentieth embodiment.

As shown in FIG. 35, the display device Dv according to the twentieth embodiment is constructed in approximately the same manner as in the display device Dq according to the fifteenth embodiment (see FIG. 30). However, the former is different from the latter in the following points. That is, a portion of the optical waveguide plate 60 for constructing the light-shielding plate 12 corresponding to a lower portion of the light-transmitting section 20 is a tapered surface 150 which is widened toward the end of the second principal surface of the light-shielding plate 12. The plate member 18a of the displacement-transmitting section 18 is inclined in conformity with the inclination of the tapered surface 150 of the light-transmitting section 20. A mediating element 70 is formed at the tapered surface 150 of the light-transmitting section 20.

When the actuator element 14 is in the natural state, a state is given in which the plate member 18a of the displacement-transmitting section 18 is separated from the light-shielding plate 12. Accordingly, the light 10, which is leaked through the mediating element 70, is radiated onto the light-emitting element 50 of the light-emitting section 130. The light behaves as the transmitted light which passes through the light-transmitting section 20, and it is radiated from the first principal surface of the light-shielding plate 12. In this embodiment, the lower portion of the light-transmitting section 20 is the tapered surface 150 having the inclination. Further, the mediating element 70 is formed at the portion of the tapered surface 150. Therefore, the light 10, which is leaked through the mediating element 70, is efficiently introduced into the light-emitting element 50. This feature results in the improvement in brightness.

On the other hand, when the actuator element 14 is operated to make the displacement in the upward direction, the plate member 18a of the displacement-transmitting section 18 contacts with the mediating element 70. Accordingly, the radiation of the leakage light through the mediating element 70 disappears, and the radiation of the light through the light-transmitting section 20 disappears.

Also in the display device Dv, no light is radiated from any portion other than the light-transmitting section 20. Further, there is no leakage light at all toward the first principal surface, which would be otherwise caused by any defect or the like of the optical waveguide plate 60. It is possible to efficiently utilize the light 10 introduced into the optical waveguide plate 60. The black level of the black background display on the screen obtained when the device is not in the operation state is approximately the same as that of the black background display obtained when the device is in the operation state. This feature contributes to the improvement in contrast, and it results in the improvement in image quality of the displayed image as well.

Next, a display device Dw according to the twenty-first embodiment will be explained with reference to FIG. 36. Components or parts corresponding to those shown in FIG. 35 are designated by the same reference numerals, duplicate explanation of which will be omitted.

Figure 36:
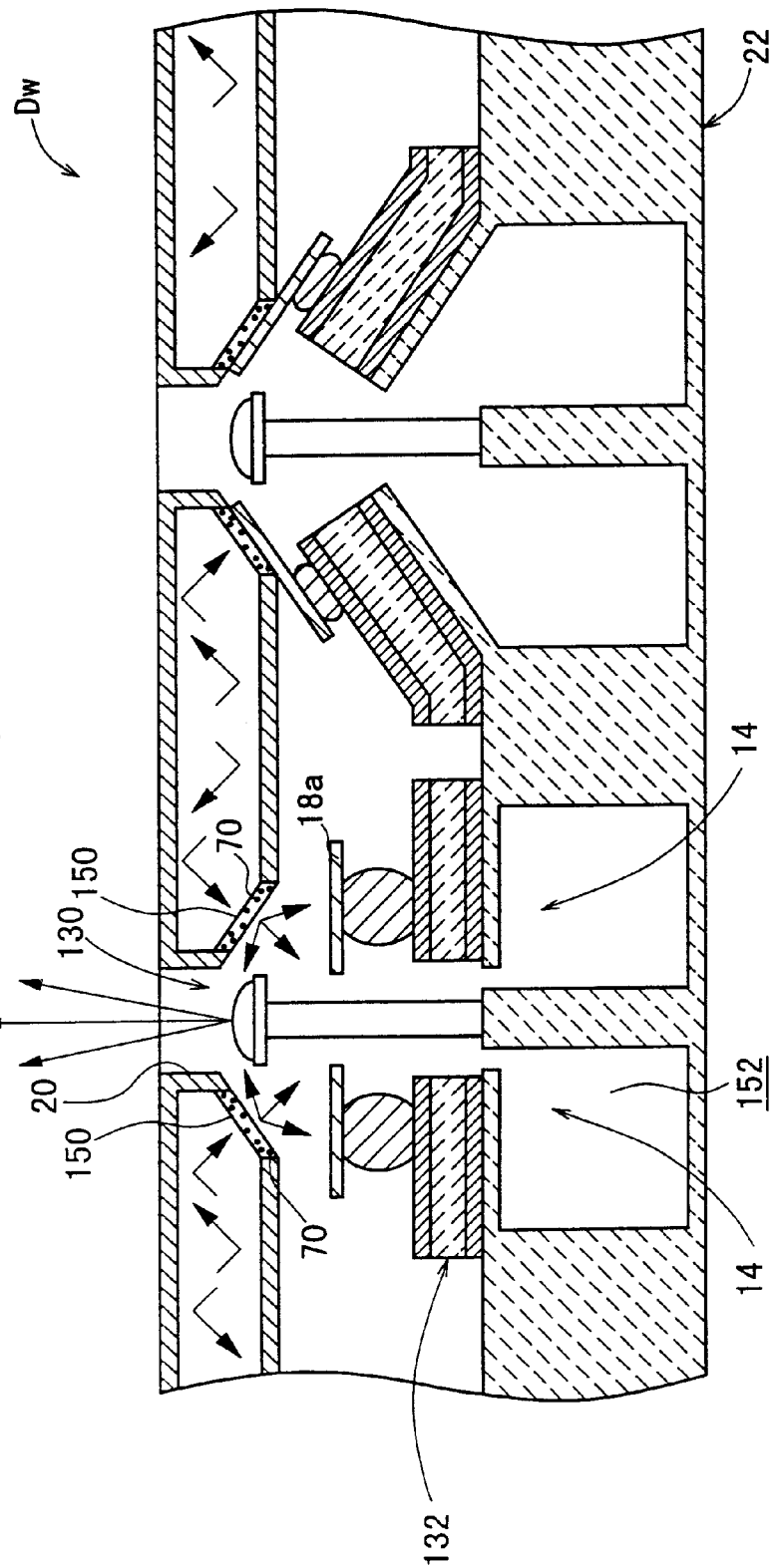
FIG. 36 shows an arrangement illustrating a display device according to a twenty-first embodiment.

As shown in FIG. 36, the display device Dw according to the twenty-first embodiment is constructed in approximately the same manner as in the display device Dv according to the twentieth embodiment (see FIG. 35). However, the former is different from the latter in the following points. That is, an actuator substrate 22 used herein has a flat plate-shaped configuration with a window 152 provided at a portion corresponding to the picture element. The shutter section 132 includes two actuator elements 14 which are provided on both sides of the light-emitting element 50. The actuator element 14 has the cantilever beam structure (see FIG. 13). When the actuator element 14 is operated, the actuator element 14 makes the displacement in the upward direction.

Of course, the shutter section 132 may be constructed as including a ring-shaped actuator element 14 formed to surround the light-emitting section 130, and a ring-shaped displacement-transmitting section 18 formed on the actuator element 14.

When the actuator element 14 is in the natural state, a state is given in which the plate member 18a of the displacement-transmitting section 18 is separated from the light-shielding plate 12. Accordingly, the light 10, which is leaked through the mediating element 70, is radiated onto the light-emitting element 50 of the light-emitting section 130. The light behaves as the transmitted light which passes through the light-transmitting section 20, and it is radiated from the first principal surface of the light-shielding plate 12. Also in this embodiment, the lower portion of the light-transmitting section 20 is the tapered surface 150 having the inclination, in the same manner as in the display device Dv according to the twentieth embodiment. Further, the mediating element 70 is formed at the portion of the tapered surface 150. Therefore, the light, which is leaked through the mediating element 70, is efficiently introduced into the light-emitting element 50. This feature results in the improvement in brightness.

On the other hand, when the actuator element 14 is operated to make the displacement in the upward direction, the plate member 18a of the displacement-transmitting section 18 contacts with the mediating element 70. Accordingly, the radiation of the leakage light through the mediating element 70 disappears, and the radiation of the light through the light-transmitting section 20 disappears.

Also in the display device Dw, no light is radiated from any portion other than the light-transmitting section 20. Further, there is no leakage light at all toward the first principal surface, which would be otherwise caused by any defect or the like of the optical waveguide plate 60. It is possible to efficiently utilize the light 10 introduced into the optical waveguide plate 60. The black level of the black background display on the screen obtained when the device is not in the operation state is approximately the same as that of the black background display obtained when the device is in the operation state. This feature contributes to the improvement in contrast, and it results in the improvement in image quality of the displayed image as well.

Next, a display device Dx according to the twenty-second embodiment will be explained with reference to FIG. 37. Components or parts corresponding to those shown in FIG. 18 are designated by the same reference numerals, duplicate explanation of which will be omitted.

Figure 37:
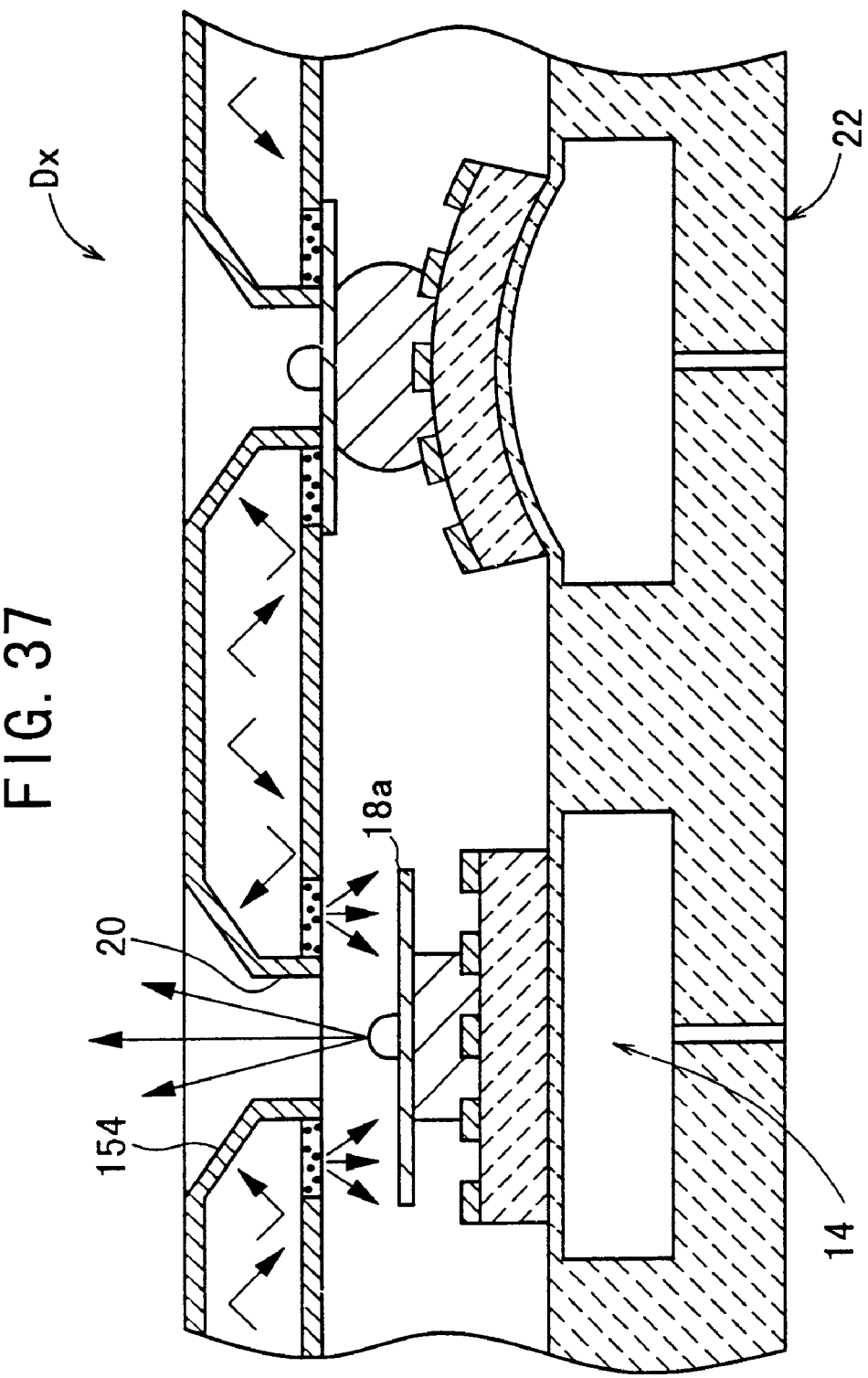
FIG. 37 shows an arrangement illustrating a display device according to a twenty-second embodiment.
Figure 38:
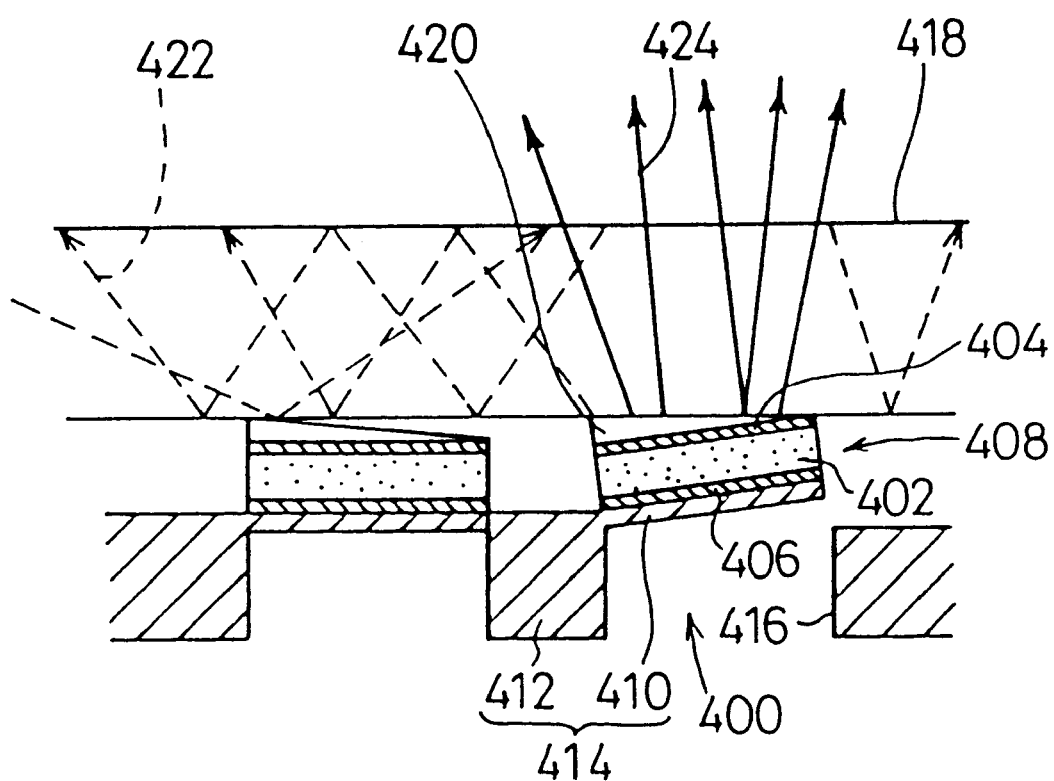
FIG. 38 shows an arrangement illustrating a display device concerning an illustrative example suggested by the present applicant.

As shown in FIG. 37, the display device Dx according to the twenty-second embodiment is constructed in approximately the same manner as in the display device Dc according to the third embodiment (see FIG. 18). However, the former is different from the latter in that an upper portion of the light-transmitting section 20 of the light-shielding plate 12 is a tapered surface 154, and the aperture width of the light-transmitting section 20 is widened toward the first principal surface of the light-shielding plate 12.

When the actuator element 14 is in the natural state, a state is given in which the plate member 18a of the displacement-transmitting section 18 is separated from the light-shielding plate 12. Accordingly, the light 10, which is leaked through the mediating element 70 formed at the second principal surface of the light-shielding plate 12, is radiated onto the light-emitting element 50. The light behaves as the transmitted light which passes through the light-transmitting section 20, and it is radiated from the first principal surface of the light-shielding plate 12.

On the other hand, when the actuator element 14 is operated to make the displacement in the upward direction, a situation is given in which plate member 18a closes the mediating element 70. Accordingly, the radiation of the leakage light through the mediating element 70 disappears, and the radiation of the light through the light-transmitting section 20 disappears.

Also in the display device Dx, no light is radiated from any portion other than the light-transmitting section 20. Further, there is no leakage light at all toward the first principal surface, which would be otherwise caused by any defect or the like of the optical waveguide plate 60. It is possible to efficiently utilize the light 10 introduced into the optical waveguide plate 60. The black level of the black background display on the screen obtained when the device is not in the operation state is approximately the same as that of the black background display obtained when the device is in the operation state. This feature contributes to the improvement in contrast, and it results in the improvement in image quality of the displayed image as well.

Especially, in the display device Dx, the upper portion of the light-transmitting section 20 is the tapered surface 154 having the inclination. Accordingly, it is possible to obtain a wide angle of view.

It is a matter of course that the display device according to the present invention is not limited to the embodiments described above, which may be embodied in other various forms without deviating from the gist or essential characteristics of the present invention.

What is claimed is:

1. A display device comprising:
   a light-shielding plate;

light-transmitting sections formed on said light-shielding plate corresponding to a large number of picture elements, for transmitting light toward a first principal surface of said light-shielding plate; and a shutter means provided opposingly to a second principal surface of said light-shielding plate, for selectively intercepting said light to be transmitted through each of said light-transmitting sections, in response to an input signal.

2. The display device according to claim 1, wherein said shutter means comprises:

an actuator element provided corresponding to each of said large number of light-transmitting sections; and a shutter mechanism for intercepting said light to be transmitted through said each of said light-transmitting sections substantially in synchronization with operation of said actuator element.

3. The display device according to claim 2, wherein:

said shutter mechanism includes a displacement-transmitting section formed on said actuator element; and said displacement-transmitting section includes a light-shielding section provided at a portion opposed to said light-shielding plate.

4. The display device according to claim 3, wherein said light-shielding section of said displacement-transmitting section is provided at a position at which an optical path communicating with the outside through said light-transmitting section is intercepted when said actuator element is operated.

5. The display device according to claim 4, wherein said optical path is intercepted by displacing said light-shielding section with respect to said second principal surface of said light-shielding plate in its normal direction in accordance with said operation of said actuator element.

6. The display device according to claim 2, wherein said actuator element is formed on an actuator substrate made of ceramics.

7. The display device according to claim 6, wherein said actuator substrate is formed as a thin-walled diaphragm section, and said actuator element is formed in an integrated manner thereon.

8. The display device according to claim 6, wherein said actuator substrate has at least one hollow space, a thin-walled portion thereof is formed as a diaphragm section, and said actuator element is formed in an integrated manner thereon.

9. The display device according to claim 6, wherein said actuator element includes a shape-retaining layer for making movement in a direction to make separation and/or approach from said second principal surface of said light-shielding plate in accordance with an applied electric field, and an operating section having at least a pair of electrodes formed on said shape-retaining layer.

10. The display device according to claim 1, wherein said light-shielding plate is arranged such that at least its first principal surface and an inner wall surface of said light-transmitting section are shielded from light.

11. The display device according to claim 10, wherein:

said light-shielding plate is constructed such that a first principal surface of an optical waveguide plate for introducing said light thereinto and said inner wall surface of said light-transmitting section are shielded from light; and a light-introducing section for releasing said light introduced into said optical waveguide plate as leakage light is provided at a portion of a second principal surface of said optical waveguide plate in the vicinity of said light-transmitting section.

12. The display device according to claim 11, wherein said light-introducing section is constructed by a mediating element formed at a portion of said second principal surface of said optical waveguide plate in the vicinity of said light-transmitting section.

13. The display device according to claim 11, wherein a portion of said second principal surface of said optical waveguide plate except for said light-introducing section is shielded from light.

14. The display device according to claim 11, wherein:

a light-emitting section is disposed on a side of said second principal surface of said light-shielding plate; and said light to be transmitted through said light-transmitting section is generated by radiating said leakage light from said optical waveguide plate onto said light-emitting section.

15. The display device according to claim 14, wherein said light-emitting section is constructed by a light-emitting element or a reflective element provided corresponding to each of said displacement-transmitting sections.

16. The display device according to claim 10, wherein:

a light-emitting section is disposed on a side of said second principal surface of said light-shielding plate; and said light to be transmitted through said light-transmitting section is generated by radiating said light introduced from the outside onto said light-emitting section.

17. The display device according to claim 16, wherein said light-emitting section is constructed by a light-emitting element or a reflective element provided corresponding to each of said displacement-transmitting sections.

* * * * *